(12) United States Patent
Thériault

(10) Patent No.: US 6,233,054 B1
(45) Date of Patent: May 15, 2001

(54) FOURIER-TRANSFORM SPECTROMETER CONFIGURATION OPTIMIZED FOR SELF EMISSION SUPPRESSION AND SIMPLIFIED RADIOMETRIC CALIBRATION

(75) Inventor: Jean-Marc Thériault, Québec (CA)

(73) Assignee: Her Majesty the Queen in right of Canada, as represented by the Minister of National Defence of Her Majesty's Canadian Government, Ottawa (CA)

( * ) Notice: Subject to any disclaimer, the term of this patent is extended or adjusted under 35 U.S.C. 154(b) by 0 days.

(21) Appl. No.: 09/288,609

(22) Filed: Apr. 9, 1999

Related U.S. Application Data

(60) Provisional application No. 60/081,386, filed on Apr. 10, 1998.

(51) Int. Cl.⁷ ............................................. G01B 9/02
(52) U.S. Cl. ................................. 356/451; 359/629
(58) Field of Search ............................ 359/629, 634; 356/450, 451, 452, 453, 454, 455, 456

(56) References Cited

U.S. PATENT DOCUMENTS

| | | | |
|---|---|---|---|
| 3,743,378 | * 7/1973 | Bousky | 350/147 |
| 4,095,899 | 6/1978 | Vanasse . | |
| 4,095,900 | 6/1978 | Murphy et al. . | |
| 4,383,762 | 5/1983 | Burkert . | |
| 4,779,983 | 10/1988 | Learner et al. . | |
| 5,066,990 | 11/1991 | Rippel . | |

FOREIGN PATENT DOCUMENTS 1010277  11/1965  (GB) .

OTHER PUBLICATIONS

Revercomb, et al.; "Radiometric calibration of IR Fourier transform spectrometers: solution to a problem with the High–Resolution Interferometer Sounder"; Applied Optics, vol. 27, No. 15, pp. 3210–3218; Aug. 1, 1988.

Weddigen et al,; "Phase corrections for the emission sounder MIPAS–FT"; Applied Optics, vol. 32, No. 24, pp. 4586–4589, Aug. 20, 1993.

Theriault et al.; "Differential detection with a double–beam interferometer"; SPIE, vol. 3082 Electro–Optical Technology for Remote Chemical Detection and Identification; pp. 65–75; Apr. 21, 1997.

Theriault; "Beam splitter layer emission in Fourier–transform infrared interferometers"; Applied Optics, vol. 37, No. 36, pp. 8348–8351; Dec. 20, 1998.

Theriault; "Modeling the responsivity and self–emission of a double–beam Fourier–transform infrared interferometer"; Applied Optics, vol. 38, No. 3, pp. 505–515; Jan. 20, 1999.

* cited by examiner

Primary Examiner—Frank G. Font
Assistant Examiner—Andrew H. Lee
(74) Attorney, Agent, or Firm—Larson & Taylor, PLC

(57) ABSTRACT

A beamsplitter for a double beam interferometer with the interferometer and beamsplitter being designed to provide suppression of the interferometer's self emissions by optical substraction. The beamsplitter is formed of two flat transparent substrates having balanced transmission characteristics at the wavelengths of interest. These substrates are superposed and mounted next to each other with a thin layer of air squeezed between adjacent flat surfaces of the substrates. A temperature sensor on a mount in which the beamsplitter is installed allows for simplified radiometric calibration of the interferometer.

20 Claims, 11 Drawing Sheets

FOURIER-TRANSFORM SPECTROMETER CONFIGURATION OPTIMIZED FOR SELF EMISSION SUPPRESSION AND SIMPLIFIED RADIOMETRIC CALIBRATION

This application claims benefit of provisional application 60/081,386, filed Apr. 10, 1998.

FIELD OF THE INVENTION

The invention relates generally to a beam-splitter for a spectrometer, in particular for a Fourier-transform spectrometer (FTS) with the spectrometer and beam-splitter having a configuration to optimize suppression of the instrument's self emissions by optical subtraction and allow simplified radiometric calibration of the spectrometer.

BACKGROUND OF THE INVENTION

Spectral information provided by Fourier-transform spectrometers (FTS) is currently used to diagnose chemical processes, detect pollutants, monitor atmospheric conditions in addition to many other uses supporting a variety of industrial activities. FTS, because of its attributes, appears to have become a tool of choice in the infrared (IR) and especially for applications requiring high detection sensitivity, high spectral resolution, wide spectral coverage and flexibility for system integration. In many applications, FTS is used as a spectral radiometer to determine the spectral density of energy contained in the radiation under study. However, in these applications, the instrument must be calibrated radiometrically and such calibration is rather cumbersome and especially when these instruments are operating at IR wavelengths. The main difficulty arises during operation in IR wavelengths since the output signal of the FTS contains parasitic radiation (self-emissions) in the IR which are generated by the instrument itself. Consequently, a peculiar calibration procedure involving two reference measurements is normally required in order to obtain and correct for this self-emission term in addition to the usual responsivity parameter. This self-emission term is generally uncontrolled and variable in time in existing Fourier-transform IR spectrometers (FTIR). Therefore, the best way to acquire radiometrically accurate spectra with these spectrometers is by doing frequent calibration measurements. The maximum accuracy is achieved when the two calibration measurements are updated for each target measurement. This increases the time required to generate a single calibrated spectrum by a factor of three. This requirement for frequent calibration presents a burden that reduces the efficiency and the applicability of these FTIR instruments, particularly for real time sensing. A paper entitled "Radiometric calibration of IR Fourier transform spectrometers: Solution to a Problem with the High-Resolution Interferometer Sounder" by H. E. Revercomb et al in Applied Optics, Vol. 27, No. 15, Aug. 1, 1988, is directed to a calibrated Fourier transform spectrometer known as the High-Resolution Interferometer Sounder (HIS). This particular HIS instrument performs in flight radiometric calibration, using observations of hot and cold blackbody reference sources as the basis for two-point calibrations. Another paper entitled "Differential detection with a double-beam interferometer", which is incorporated by reference, by J-M Thériault et al in the SPIE Vol. 3082 (pages 65–75) of Apr. 21, 1997 provides analysis of some methods used to radiometric calibrate single-beam and dual beam interferometers.

Various types of spectrometers exist such as the Michelson Interferometer described in British Patent 1,010,227 in which radiation from a source is collimated and the collimated beam is directed to a beam splitter, a semi-transparent plate at a 45° angle to the beam, where part of the beam passes through the plate towards a mirror arrangement which reflects it back to the plate and then that plate reflects it towards an optical system which focuses that portion of the beam onto a detector. The beam splitter reflects a portion of the collimated beam from the source towards another mirror which reflects that portion back towards the beam splitter where it passes through the beam splitter towards the optical system that also focuses this portion onto the detector. One of the mirrors is movable to adjust the lengths of the beam paths so they can be made equal resulting in rays falling on the detector being in phase and producing a strong signal from the detector. If the movable mirror, however, is positioned so that there is a difference in length between the paths, the rays of a certain wavelength in one beam path will not be in phase with corresponding rays in the other beam path resulting in changes in the magnitude of the signal from the detector. A plot of the fluctuations of the signal from the detector against movement of the movable mirror from when the path lengths are equal is known as an "interferogram" and this can be used to deduce the wavelength distribution of radiation from the source. This British Patent is particularly directed to an arrangement for producing a difference in path lengths of the two beams from the beam splitter.

A number of different types of arrangements have been used to produce a difference in path lengths of beams from a beam splitter in spectrometers, several types of arrangements using a rigid pendulum structure with a moveable retroreflector (or retroreflectors) being described in U.S. Pat. No. 4,383,762 by Peter Burkert. U.S. Pat. No. 4,383,762 recognized that two-beam interferometers for measuring atmospheric transmissions when used in smaller spacecraft and/or measuring in low temperature ranges in cryostats require not only low weight and small dimensions but also extremely low heat generation as mentioned in the last paragraph in column 2. This U.S. Patent further states that "High complexity for low temperature measuring in cryostats is necessary for very weak radiation to prevent the inherent radiation of the measuring instrument from blanketing the source of radiation". Therefore, frictional losses in sliding guides, spindle guides and similar mechanical guides of moving parts should be minimized. In order to minimize those frictional losses, P. Burket proposed the use of a retroreflector in the path of one beam from the beam splitter which reflects that beam to a mirror and then back to the beam splitter and from there to the detector. That retroreflector is attached to the end of the rotatable rigid pendulum which accurately confines that retroreflector to a single plane during the swing of the pendulum from one position to another. The swing of the pendulum, as a result, produces a difference in path lengths of beams from the beam splitter that is used to determine the unknown spectrum of a source by evaluating the interferogram produced. This U.S. Patent also teaches several modified arrangements to this single pendulum including a double pendulum type with retroreflectors in each arm of the pendulum where one retroreflector is located in each beam path from the beam splitter to alter both beam path lengths. These pendulum retroreflectors arrangements minimise heat generated by frictional losses during movement of parts required to alter the path lengths of the two beams from the beam splitter. The friction in the pendulum bearing can also be minimised by using ball bearings or magnetic bearing as mentioned at the bottom of column 3 in U.S. Pat. No. 4,383,762.

U.S. Pat. No. 5,066,990 by H. Ripple describes another double pendulum type interferometer with mirror arrangements at each end of the pendulum's arms. Each mirror arrangement has two mirrors at right angles to each other and forms a retroreflector similar to those described in U.S. Pat. No. 4,383,762. Those mirror arrangements (retroreflectors) are located in each of the beam paths from the beam splitter and reflect these beams to a mirror which reflects the beams back towards the associated retroreflector where the beams are reflected back to the beam splitter and then to a detector. H. Ripple mentions that one problem that always arises is the compensation of differing temperature conditions in the interferometer as far as possible. H Ripple then indicates in the fifth paragraph in column 1 that in the interest of the smallest possible influence of this problem, "interferometers are usually provided with a thermostat, i.e. mounted in arrangements within which the greatest possible temperature constancy is sought with the most uniform temperature distribution possible". H. Rippel then states that in "practice, however, such systems are limited since the temperature regulation is limited according to the temperature conditions at particular points or in particular narrow partial regions within the instrument, so that certain temperature differences within the instrument usually cannot be completely avoided", H. Rippel describes a system wherein this temperature sensitivity is reduced by placing the semi-transparent mirror (a beam splitter) and the mirrors, those reflecting the beams back to the retroreflectors on the arms of the pendulum, onto a common carrier. That carrier is expediently manufactured of aluminum since it has high heat conductivity so that the beam splitter and mirrors on that carrier reach a largely corresponding temperature to considerably reduce the temperature sensitivity of the system.

U.S. Pat. No. 4,095,899 by George A. Vanasse describes another type of interferometer in which a first and a second beam splitter are optically aligned with the detector, the first beam splitter reflecting portions of an input beam to adjustable reflectors which reflect those portions back through the first beam splitter to the detector.

A second input beam is directed towards the second beam splitter which is optically aligned with the first beam splitter so that any output from the second beam splitter which is common to both input beams will be suppressed when they are combined at the second beam splitter. This arrangement can be utilised as a simple pollution detector or monitor if the first input beam, for instance, consists of radiation from an effluent (emitted by a stack, automobile, etc.) being studied after passing through an intervening atmosphere while the second input beam consists of radiation from an adjacent field of view which does not contain the effluent. Radiation common to both fields of view will then be suppressed in the interferometer and the resultant interferogram at the output will contain a structure due, for the most part, to only the effluent under study. U.S. Pat. No. 4,095,900 by R. E. Murphy is related to U.S. Pat. No. 4,095,899 in that both have a common inventor and it also provides an optical technique for suppressing unwanted background radiation from that originated by a target. Both of these last two patents are, however, directed to a structure that suppresses unwanted external background radiation and do not provide a structure to effectively suppress parasitic radiation (self-emissions) generated by the interferometer internally.

SUMMARY OF THE INVENTION

It is an object of the present invention to provide a beam splitter for a Fourier-transform Spectrometer that substantially optimises suppression of infrared self emissions from the internal structure of the spectrometer.

It is a further object of the present invention to provide a Fourier-transform spectrometer configuration to optimise suppression of the instruments self-emissions and allow for simplified radiometric calibration of the spectrometer.

A beamsplitter, according to one embodiment of the invention, comprises two flat transparent substrates which are substantially identical in form and which have balanced transmission characteristics at the wavelengths of interest, the substrates being superposed and mounted next to each other with a thin layer of air squeezed between adjacent flat surfaces of the substrates and said substrates having exterior flat surfaces with similar antireflective coatings being provided on said exterior surfaces.

According to a further embodiment of the invention, a beamsplitter comprises two flat transparent substrates which are substantially identical in form and which have balanced transmission characteristics at wavelengths of interest are superposed and mounted next to each other with a thin layer of air squeezed between adjacent flat surfaces of the substrates is located in a position in a double beam interferometer where optics associated with one input port directs a collimated beam of radiation from one field-of-view onto one exterior surface of the beamsplitter and optics associated with another input port of the interferometer directs a collimated beam of radiation from an adjacent field-of-view onto an opposite exterior surface of the beam splitter, the interferometer having substantially similar retrorefletors located to reflect radiation that transverses said beamsplitter from both beams back towards the exterior surfaces of the beamsplitter to produce an interferogram with the resulting output being directed outwards from the beamsplitter by optics towards a detector and wherein at least one of the retroreflectors is movable in a direction parallel to that of the beam of radiation associated with that detector.

BRIEF DESCRIPTION OF THE DRAWINGS

The following detailed description of the invention will be more readily understood when considered in conjunction with the accompanying drawings, in which:

FIG. 7C shows the amplitude reflection and transmission of the beam from INPUT-1.

DESCRIPTION OF THE PREFERRED EMBODIMENT

Figure 1:
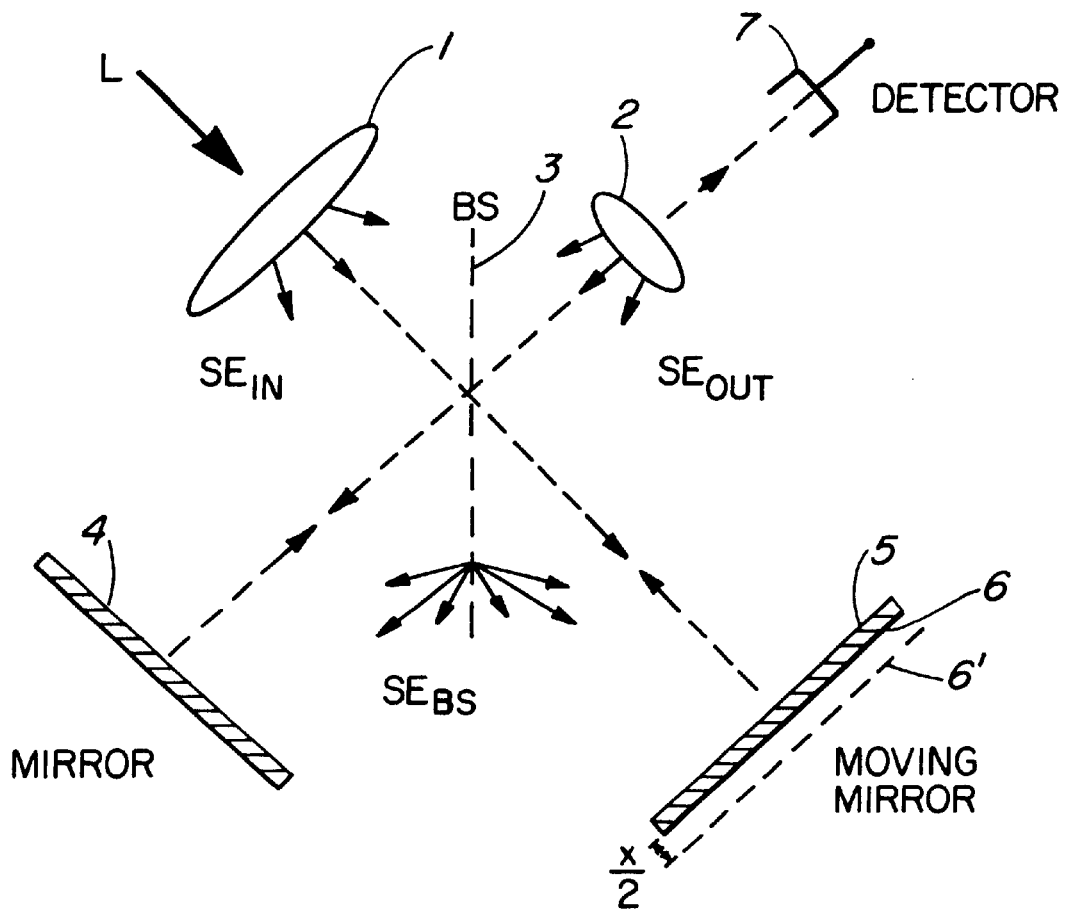
FIG. 1 is a schematic diagram of a known Fourier-transform Infrared (FRIR) spectrometer, which illustrates self-emissions contributions from the components forming this type of interferometer.

Interferometers, such as Michelson interferometers using beam splitters to provide dual beams, with the use of computers to process a Fourier transform of their measurements, have been employed in the infrared (IR) and visible to the near ultraviolet region of the spectrum. Spectral information provided by these Fourier transform spectrometers (FTS) are frequently used to diagnose chemical processes, detect pollutants, monitor atmospheric conditions by remote detection and identification of gaseous emissions in addition to many other uses supporting a variety of industrial activities. The FTS interferometers now appear to be a tool of choice for use in the infrared region of the spectrum, especially for applications requiring high detection sensitivity, high spectral resolution, wide spectral coverage and flexibility for system integration. In many applications, FTS is used as a spectral radiometer to determine the spectral density of energy contained in radiation from a source being monitored. In these cases, it is necessary to calibrate the instrument radiometrically and this sort of calibration is presently rather cumbersome and especially so for instruments operating in the infrared. The major difficulty with this procedure arises from the fact that the output signal of a FTS contains parasitic IR radiation generated internally (self emissions) by the instrument itself. Consequently, a calibration procedure involving two reference measurements has generally been applied in order to obtain and correct for this self emission term in addition to the usual responsivity parameter. This self emission term is generally uncontrolled in current Fourier transform IR spectrometers (FTIR) and variable in time due to thermal variations. The best way to acquire radiometrically accurate spectra is by using frequent calibration measurements with the maximum accuracy being achieved when two calibration measurements are updated for each target measurement. This, however, increases the time required to generate a single calibrated spectrum by a factor of three. This frequent calibration requirement presents a serious burden, which reduces the efficiency and the applicability of the FTIR instrument, especially for real time sensing.

In a basic FTS, such as a Michelson, a beam from the source is divided by a beam splitter into two separate components, which are reflected by mirrors back to the beam splitter where they are recombined after travelling different optical paths. The recombined beam then emerges from the beam splitter and is directed to a detector. The Michelson interferometer is designed so that one or both of its mirrors move periodically around a mean position in order to create a periodic optical path difference for the two separate components which are recombined at the beam splitter. Depending on the optical path difference, the recombined beams (interfering beams) will add in amplitude or subtract depending on the wavelength. In the case when a monochromatic radiation of unit amplitude is incident on the interferometer, the emergent amplitude A(x) from the beam splitter is:

$$A(x)=(rt)+(tr)e^{i\,2\pi\sigma x} \qquad (1)$$

Where $\sigma$ is the wavenumber (i.e. the inverse of the wavelength or $1/\lambda$), x is the optical path difference between the two interfering beams while r and t represent the amplitude reflection and transmission coefficients of the beam splitter respectively. In equation (1), the temporal variation of the amplitude terms have been neglected assuming that the observation time is long enough to take the averaged amplitude.

Neglecting the electronic responsivity of the instrument, its optical responsivity K depends essentially on the transmission and reflection of the many optical elements. The emerging intensity I(x), by definition, is found by multiplication of the amplitude A(x) with its complex conjugate A(X)* yielding:

$$I(x)=A(x)A^*(x)=2RT+RT(e^{i2\pi\sigma x}+e^{-i2\pi\sigma x}) \qquad (2)$$

Where the beam splitter's reflection R and transmission T in intensity are given by (rr* and tt*) respectively. The interferogram F(x) is defined as the modulated component of the above intensity I(x), i.e.

$$F(x)=K(e^{i2\pi\sigma x}+e^{-i\,2\pi\sigma x}) \qquad (3)$$

Where K=RT is the optical responsivity.

Equation (3) represents the interferogram obtained from a monochromatic source passing through an ideal interferometer. For a polychromatic beam of intensity B($\sigma$) that is incident on a FTS, however, the generated interferogram can be represented by the continuous summation of individual modulation associated with each spectral element which is represented by:

$$F(x)=\int_o^e B(\sigma)K(\sigma)\,(e^{i2\pi\sigma x}+e^{-i\,2\pi\sigma x})d\sigma. \qquad (4)$$

The responsity K($\sigma$) is, in this case, wavelenth dependent.

Using a mathematical artifice which consists in extending the domain of integration to include the negative values of $\sigma$ and assuming symmetric spectra for B($\sigma$) and K($\sigma$) where B($-\sigma$)=B($\sigma$) and K($-\sigma$)=K($\sigma$) leads, after rearrangement, to an interferogram more appropriate for processing. By application of the basic Fourier transform property leads, in this case to $$F(x) = \int_{-\infty}^{\infty} B(\sigma)K(\sigma)e^{i2\pi\sigma x} d\sigma \quad (5)$$

and $$B(\sigma)K(\sigma) = \int_{-\infty}^{\infty} F(x)e^{-i2\pi\sigma x} dx \quad (6)$$

Equation (5) indicates that the interferogram F(x) generated by an ideal instrument is given by the inverse Fourier transform of the raw spectrum $B(\sigma)K(\sigma)$ while equation (6) indicates that the raw spectrum is given by the Fourier transform of the interferogram.

A real interferometer, however, introduces an additional phase shift $\psi(\sigma)$ due to an imperfect compensation from dispersive elements such as substrates of the beam splitter and compensater. When this phase shift is taken into consideration, the pair of Fourier transform becomes $$F(x) = \int_{-\infty}^{\infty} [B(\sigma)K(\sigma)e^{i\psi(\sigma)}]e^{i2\pi\sigma x} d\sigma \quad (7)$$

and $$[B(\sigma)K(\sigma)e^{i\psi(\sigma)}] = \int_{-\infty}^{\infty} F(x)e^{-i2\pi\sigma x} dx \quad (8)$$

Equation (8) is the basic relation used in Fourier Spectroscopy where the complex raw spectrum is simply given by the complex Fourier transform of a real double-sided interferogram. The absolute radiometric spectrum $B(\sigma)$ is not a direct output and the instrument responsivity must be calibrated from auxiliary measurements performed on standard reference sources. It should be emphasized that a real instrument is characterized by its complex responsivity $$\mathbf{K}(\sigma) = K(\sigma)e^{i\psi(\sigma)} \quad (9)$$

Where $K(\sigma)$ and $\psi(\sigma)$ represent the module and the phase of the instrument responsivity $\mathbf{K}(\sigma)$. The bold face notation is used herein to identify complex numbers.

A standard single-input beam Michelson interferometer is illustrated schematically in FIG. 1 having input optics 1 for radiation L from a light source, output optics 2 for a detector 7, a beam splitter 3, a reflecting mirror 4 and a moveable mirror 5. Mirror 5 is moveable a distance x/2. The beam splitter 3 is at 45° to the input beam L with a portion of that beam being transmitted through 3 to moveable mirror 5, which is at 90° to that transmitted beam, and then reflected back to 3. A portion of the input beam is reflected by beam splitter 3 to mirror 4 which is at 90° to that part of the beam, mirror 4 reflecting it back to beam splitter 3 where it is recombined with the portion reflected by mirror 5 to provide an output which exits the output optics 2 and detected by detector 7.

The output signal is not only composed of the recombined signal from the beam splitter but is actually composed of radiation from different origins including some generated internally of the instrument. The most important part of the output signal does originate from the source radiation L. The remaining contributions to the output signal are generated by the instrument itself. This parasitic radiation is due to grey body emissions (IR) and stray light reflections from the interferometer components (lenses, mirrors, inner walls, etc.) and is referred to as the self-emission of the instrument.

FIG. 1 identifies the various major sources of radiation intervening in a single measurement. L is the spectral radiance of the external source (target source) while $SE_{in}$ and $SE_{out}$ represent the self emissions (raw spectra) generated by the input and output optics (1 and 2) respectively and $SE_{BS}$ represents the beam splitter's self-emission (raw spectrum). In the infrared region, the IR self-emission terms mainly depend on the temperature of the intervening components and this is quite significant for instruments operating at or near ambient, i.e. room, temperature. Separately, each of these radiation sources generates a specific interferogram and, consequently, a corresponding raw spectrum. The sum of these individual raw spectrum is:

$$S = (KL) + SE_{in} + SE_{out} + SE_{BS} \quad (10)$$

This can be simplified by defining an instrument offset O such that $$O = \frac{1}{K}(SE_{in} + SE_{out} + SE_{BS}) \quad (11)$$

yielding $$S = K(L + O) \quad (12)$$

Equation 12 represents the usual way to link the complex raw spectrum S to the target spectrum L (the one to be evaluated) taking into account the instrument characteristics which are the complex spectral responsivity K and the complex spectral offset O. The spectral offset of the instrument, as shown in Equation 11, is a rather complicated expression involving three different self-emission terms that are theoretically difficult to evaluate, in particular, for this single-beam type of instrument illustrated in FIG. 1.

The self-emission terms are usually not stable in time due to thermal variations of instrument components. Therefore, the best method of acquiring radiometrically accurate target spectra is by doing frequent calibration measurements with, ideally, the calibration being performed concurrently with each source measurement. A current method used for the accurate calibration (radiometric) of interferometric spectra is known as the two temperature calibration method using two reference blackbodies of known radiance $B_{hot}$ and $B_{amb}$ to solve the two unknowns, the spectral responsivity and the spectral offset of the instrument. Often, the hot reference blackbody is kept at a constant temperature near 60° C. and the second reference blackbody is kept at an ambient temperature near 20° C. The two corresponding raw spectra of the reference blackbodies can be defined as $S_{hot}$ and $S_{amb}$ resulting in the solution of the Equation (12) yielding:

$$K = \frac{S_{hot} - S_{amb}}{B_{hot} - B_{amb}} \quad \text{and} \quad (13)$$

$$O = \frac{S_{amb}B_{hot} - S_{hot}B_{amb}}{S_{hot} - S_{amb}} \quad \text{and} \quad (14)$$

the calibrated target spectrum is then obtained from $$L = \frac{S}{K} - O \quad (15)$$

The above discussion illustrates the usual limitations (radiometric calibration) encountered with most standard FTIR instruments i.e. the presence of variable and uncontrolled self-emissions which necessitates three consecutive measurements (target and two references) for obtaining a single calibrated spectrum L. This especially represents a burden for real time applications and limits the use of these instruments.

Figure 2A:
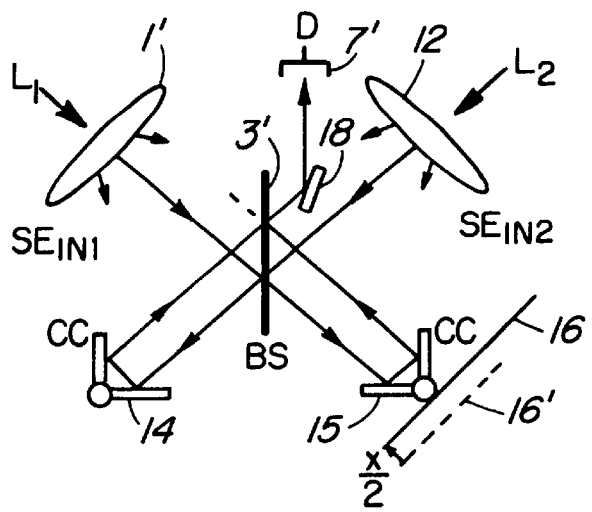
FIGS. 2A to 2C are schematic diagrams of a known double beam Michelson interferometer that use corner reflectors rather than standard flat mirrors to reflect beams back to the beamsplitter, FIGS. 2B and 2C illustrating the two out of phase interferograms obtainable with this design.

FIG. 2a is a schematic diagram of a double beam Michelson interferometer. One commercial type of dual beam interferometer is the MB-100 manufactured by Bomem, Hartman & Braun but this instrument is not specifically designed for optical subtraction and the optimization of self-emission suppression to obtain simplified calibration. However, it is the basic design of an instrument according to the present invention which is optimized for simplified calibration. The use of corner reflectors 14 and 15, rather than standard flat mirrors 4 and 5 as shown in FIG. 1 has two main advantages. These corner retroreflectors consists of mirrors at right angles to each other arranged so that one mirror is at 45° to a light beam from a source which is transmitted through or reflected from the beam splitter 3'. That mirror reflects the light to an adjacent mirror in an assembly which is arranged in a manner such that the light is reflected back to the beam splitter 3' along a parallel path to the arriving beam. In the arrangement illustrated in FIG. 2A, the corner reflector 15 is movable from position 16' to 16 in a manner similar to the movement of flat mirror 5 from 6' to 6 in FIG. 1.

One advantage of these corner reflectors (14 and 15) is that the reflected beams from 14 and 15 are offset laterally from the incident beams. This provides the advantage of decoupling input and output channels as opposed to a standard single-beam interferometer (FIG. 1) where the incident and reflected beams are superimposed. This attribute, of decoupling makes it possible to adjust independently the self-emission of each input port without affecting in any way the output optics. This is not possible with a single beam configuration.

Figure 2B:
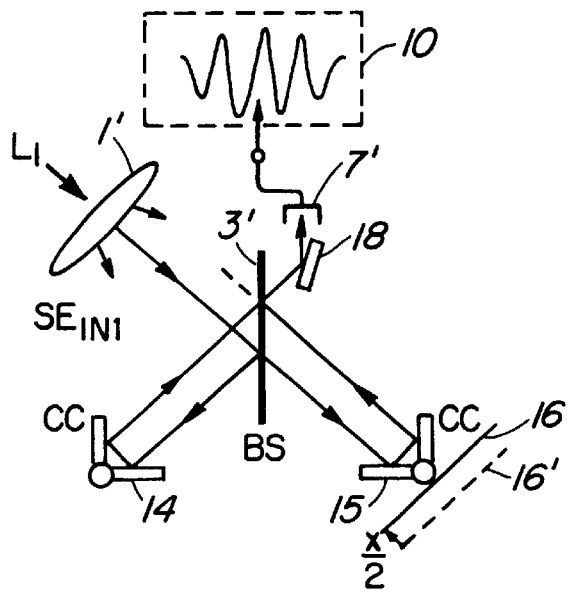
Figure 2C:
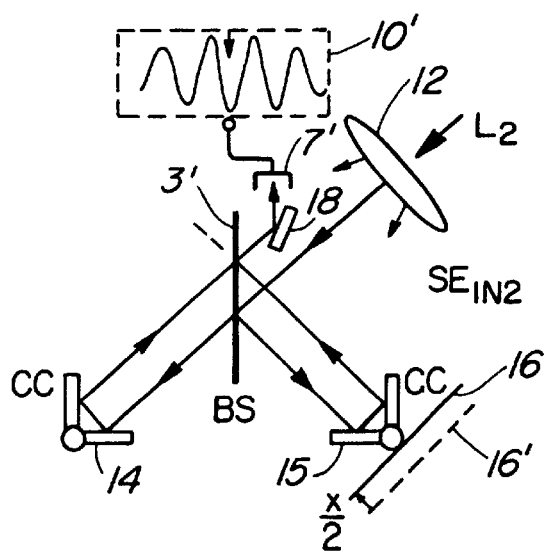

The instrument illustrated in FIG. 2A is shown with only one single output optics in which the output beam from beam splitter 3' is reflected by mirror 18 to detector 7'. The actual instrument would normally have a similar second output optics and detector on the opposite side of beam splitter 3' but this is not shown for the sack of simplicity. In this type of interferometer, the two beams from sources $L_1$ and $L_2$ to the two inputs (1' and 12 respectively) are optically combined at beam splitter 3' in a subtractive manner. This optical subtraction arises from the fact that the two interferograms associated with each input port can be out of phase depending on the instrument's design and the position of the movable corner reflector 15. This is illustrated in FIGS. 2B and 2C. In FIG. 2B, an input beam originating from source $L_1$ and first input optics 1' produces an output interferogram at detector 7' which is illustrated by the graph at 10. In FIG. 2C, an input beam originating from source $L_2$ and the second input optics 12 produces another output interferogram at detector 7' which is illustrated by the graph at 10' where 10' is out of phase with the graph 10 produced by $L_1$. These interferograms will be optically combined in a subtractive manner at beam splitter 3' and the detector 7' will only generate a signal of the difference between them.

The interferogram illustrated by graph 10 would also include the self emissions from input optics 1' ($SE_{in1}$) whereas the interferogram illustrated at 10' contains the self emissions from input optics 12 ($SE_{in2}$). A theoretically cancellation of those two self emission from each input port by optical subtraction would occur when the two self emissions terms are equal in intensity and 180° out of phase.

There are, however, two critical factors limiting this optical subtraction capability of a double beam interferometer. The first is that the optical configuration of the two input ports (mirrors and windows) must be as symmetric as possible in order to ensure the same beam attenuation and same self emissions in both ports. It is not actually physically possible to have them completely identical but differences should be minimized. The second factor is that the IR absorption in the beamsplitter coatings plays a significant factor in the instruments self emissions and this will be considered first.

Figure 3A:
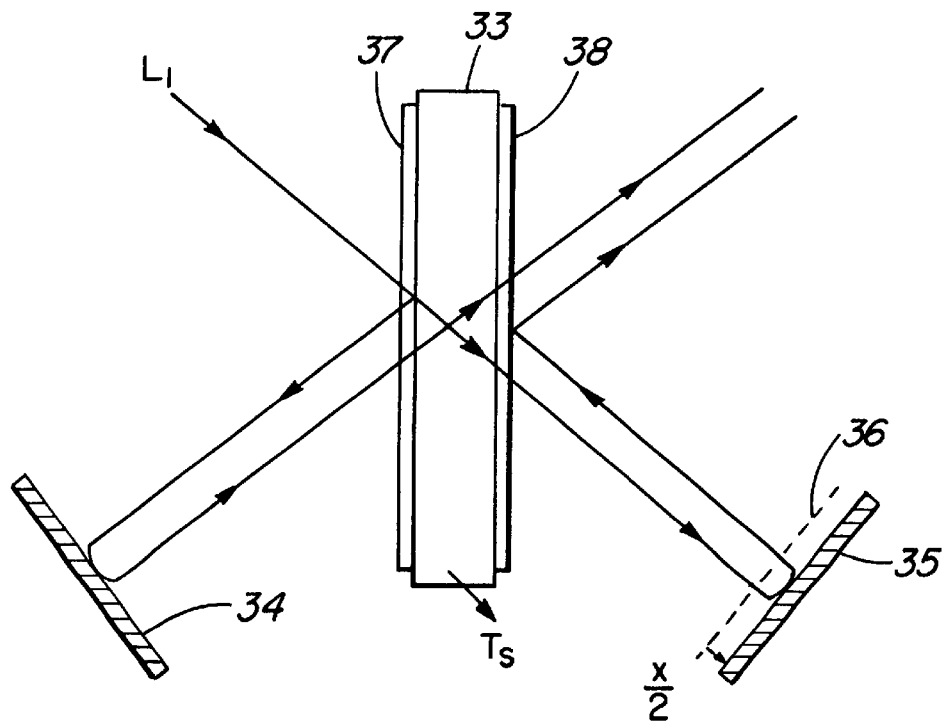
FIGS. 3A and 3B show ray tracings for a known double beam interferometer having a beam splitter made of a coated substrate, FIG. 3A showing ray tracings from a first input and FIG. 3B showing ray tracings from a second input.
Figure 3B:
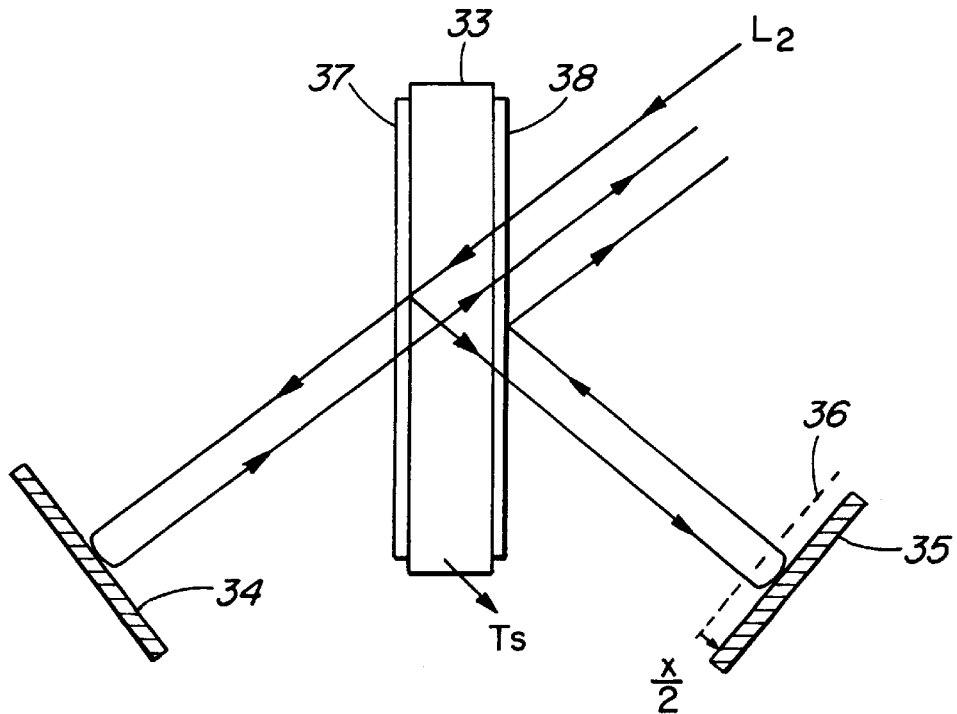

One of the most simple beamsplitter assemblies used in interferometers is a single substrate 33 with or without coatings 37 and 38 on its interfaces as shown in FIGS. 3A and 3B. FIG. 3A illustrates the ray tracings from a first input $L_1$ inside a double beam interferometer that contains this type of beam splitter. In FIGS. 3A and 3B, the stationary mirror or corner cube reflector is schematically shown and identified with the number 34 and the moveable reflector is identified with the number 35. FIG. 3B illustrates the ray tracings in this interferometer from an input $L_2$. It can be easily observed that all the rays from the first input $L_1$ in FIG. 3A will propagate only once into the substrate 33 whereas the rays from the second input $L_2$ in FIG. 3B propagate twice into the substrate. Consequently, this beamsplitter configuration generates a permanent unbalance equal to $T_s$ (substrate transmittance) between the two responsivities associated with each of the inputs. To optimize self emission cancellation by subtraction would require balanced responsivities and the only way to satisfy this condition with this beamsplitter is to restrict the spectral band of operation to a region where the substrate material is perfectly transparent. However, most of the usual substrates used in infrared such as germanium and zinc selenide exhibit absorption in certain parts of the spectrum. Therefore, that resulting unbalance in substrate transmittance between the two inputs caused by absorption in the substrate would make this type of beamsplitter unsuitable for a FTIR spectrometer designed to optimize self emission cancellation by optical subtraction.

Figure 4A:
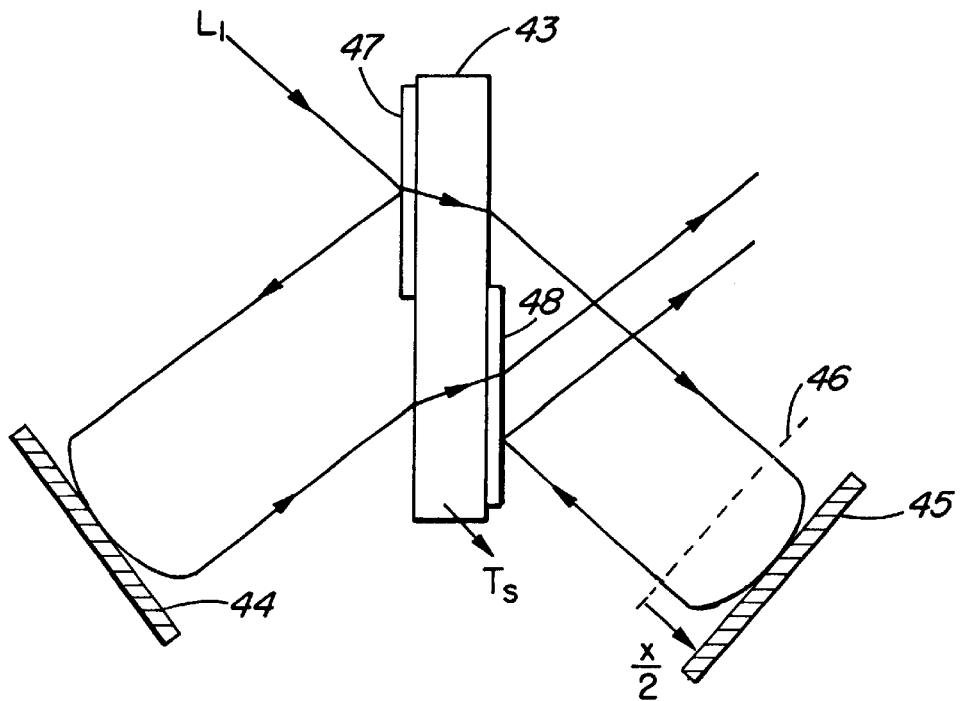
FIGS. 4A and 4B show ray tracings for a known double beam interferometer having a beam splitter with coatings applied on opposite halves of a substrate's opposite sides, FIG. 4A showing ray tracings from a first input and FIG. 4B showing ray tracing from a second input.
Figure 4B:
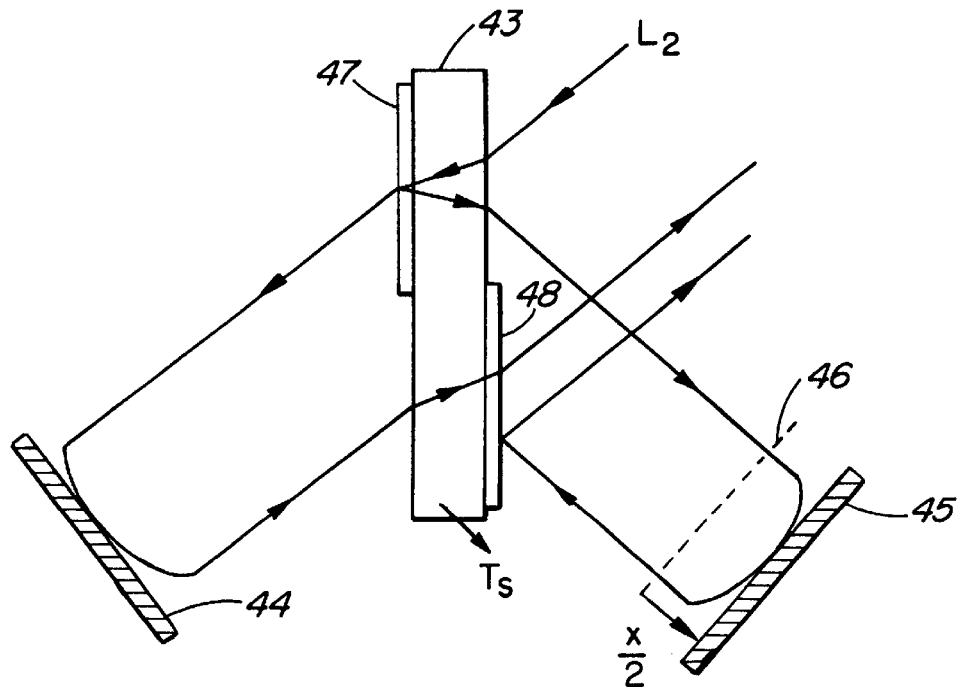

FIGS. 4A and B illustrate another single substrate beamsplitter configuration developed specifically for double beam interferometers with corner cube reflectors. In this configuration, a partially reflecting coating 47 is only applied to the upper half of one side of substrate 43, the side facing a first input $L_1$, while another partially reflecting coating 48 is only applied to the lower half of the other side of substrate 43. U.S. Pat. No. 4,779,983 by R. Learner et al describes a similar type of beam splitter with transparent wedge plates optically adhered to the uncoated half sides of the substrate. In FIGS. 4A and B, the stationary corner cube reflector is schematically shown and identified with the number 44 and the movable reflector is identified as 45. The main difference of this configuration from the one illustrated in FIGS. 3A and B is that the number of interaction (transmission and reflection) of the interfering rays from inputs $L_1$ and $L_2$ with the substrate coatings is reduced which minimizes losses and increases the instruments sensitivity. However, the rays tracing show the same limitation as in FIGS. 3A and 3B in that the rays from the first input $L_1$ propagate only once into the substrate 43 (FIG. 4A) while those from the second input $L_2$ propagate twice into the substrate 43. This will again generate the same type of permanent unbalance $T_s$ (substrate transmittance) as before.

Figure 5A:
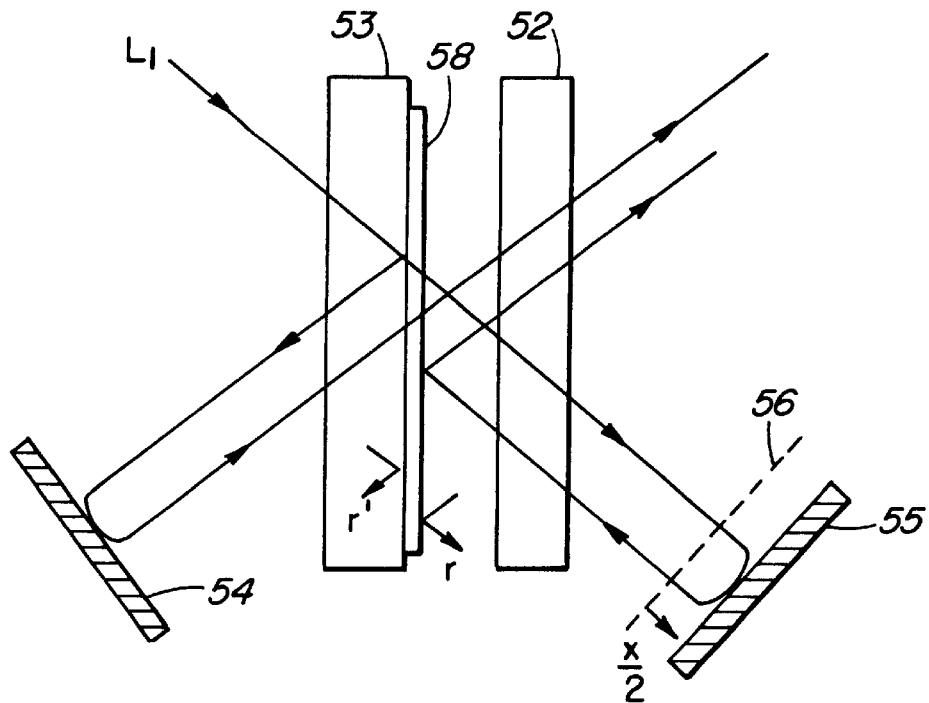
FIGS. 5A and 5B show ray tracing for a known double beam interferometer having a beamsplitter made of a single side coating substrate with a compensating plate, FIG. 5A showing ray tracings from a first input and FIG. 5B showing ray tracings from a second input.
Figure 5B:
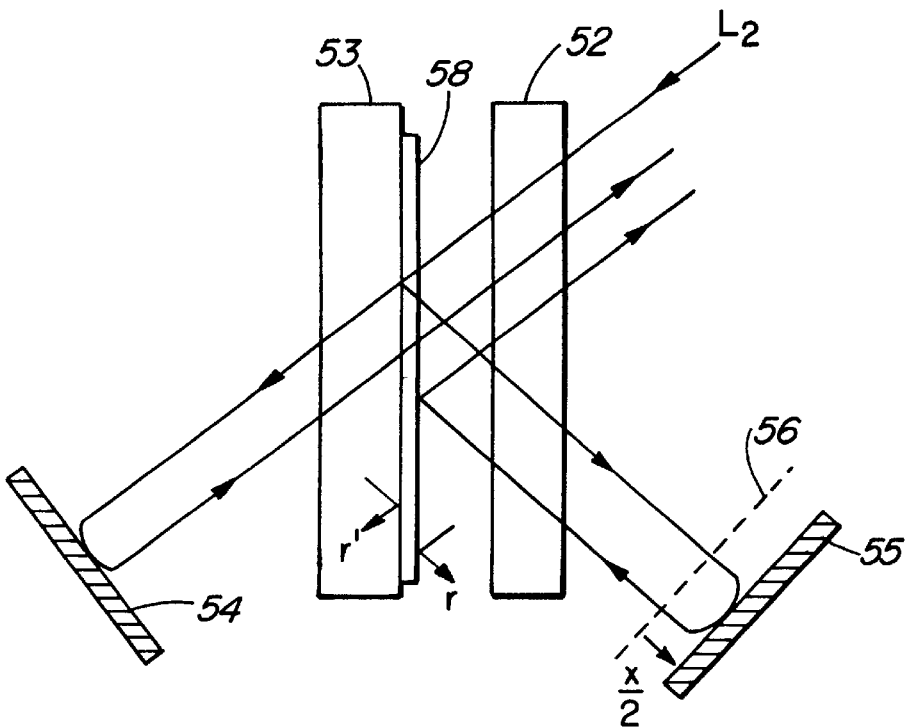

A more symmetrical beamsplitter configuration is shown in FIGS. 5A and 5B where a partially reflecting (splitting) coating 58 is present on the inner face of a first substrate 53 and a second substrate 52 is added as a compensating plate.

In this beamsplitter configuration, the number of passes through the substrates (53 and 52) are identical for both the rays from input $L_1$ (FIG. 5A) and input $L_2$ (FIG. 5B). However, this beamsplitter exhibits another source of disymmetry which is generated from the coating 58 itself. Examining FIGS. 5A and B, it is found that approximately half of the rays from input $L_1$ exhibit a substrate-layer reflection r' at coating layer 58 while corresponding rays from input $L_2$ exhibit an air-layer reflection r at the coating layer 58. Those two reflection coefficients r and r' are not identical when the partially reflecting coating 58 is absorbing. This results in an unbalance in the responsivities and self emissions between the two inputs in spectral regions where the coating 58 is absorbing. Most of the coatings used for infrared (IR) beamsplitters will absorb in certain regions of the IR spectrum, for instance germanium and thorium fluoride coatings absorb in the far IR. This beamsplitter configuration or any other configurations which do not match the number of r and r' reflections from the two inputs would not be suitable for a FTIR spectrometer designed to optimize self emission cancellation by optical subtraction. A beamsplitter optimized for self emission cancellation by optical subtraction would require a fully symmetrical beamsplitter where r'=r and the number of passes through the substrate of rays from both inputs $L_1$ and $L_2$ are the same.

Figure 6A:
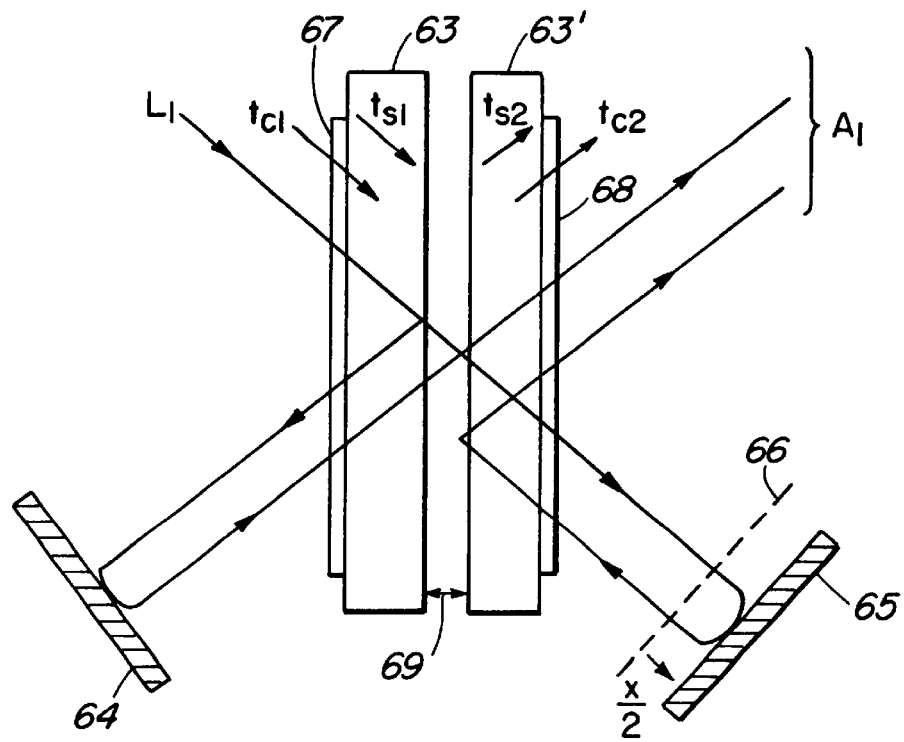
FIGS. 6A and 6B show ray tracing for a double beam interferometer having a beamsplitter configuration according to the present invention, FIG. 6A showing ray tracing from a first input and FIG. 6B showing ray tracing from a second input.

A symmetrical beamsplitter configuration, according to the present invention, which exhibits closely balanced responsivities and self emissions is shown in FIGS. 6A and B. This beamsplitter is formed of an optically thin layer of air 69 squeezed between two relatively thick substrates 63 and 63' covered with antireflective coatings 67 and 68 on their external faces. The inner faces of substrates 63 and 63' may be covered with similar transmission coatings (not shown) having properties to maximize the optical transmission or responsivity of the beamsplitter assembly. To mathematically establish the responsivities $K_1$ and $K_2$ of a double beam interferometer-spectrometer with this beamsplitter configuration, reference is first made to FIGS. 7A and 7B which illustrate ray tracing from input $L_1$ (FIG. 7A) and input $L_2$ (FIG. 7B) to the thin layer of air 69. FIG. 7C is an enlarged view of the thin layer with the transmissions $t_1$ and reflection $r_1$ of the input $L_1$ at the thin layer boundary nearest input $L_1$ being illustrated. The transmission $t'_1$ and reflection $r'_1$ from the other boundary of the thin layer 69 are also shown.

Figure 7A:
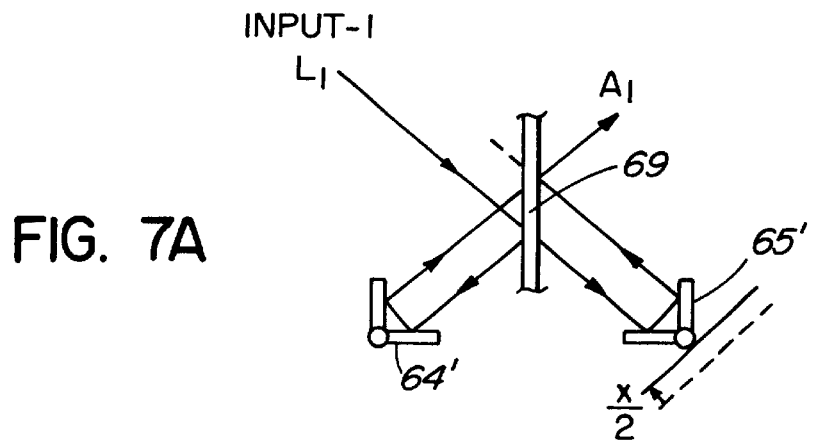
FIGS. 7A, 7B and 7C show ray tracing for beams of unit amplitude from INPUT-1 (FIG. 7A) and INPUT-2 (FIG. 7B) onto a thin layer beamsplitter symmetrically bounded by identical medium, a beamsplitter according to the present invention.
Figure 7B:
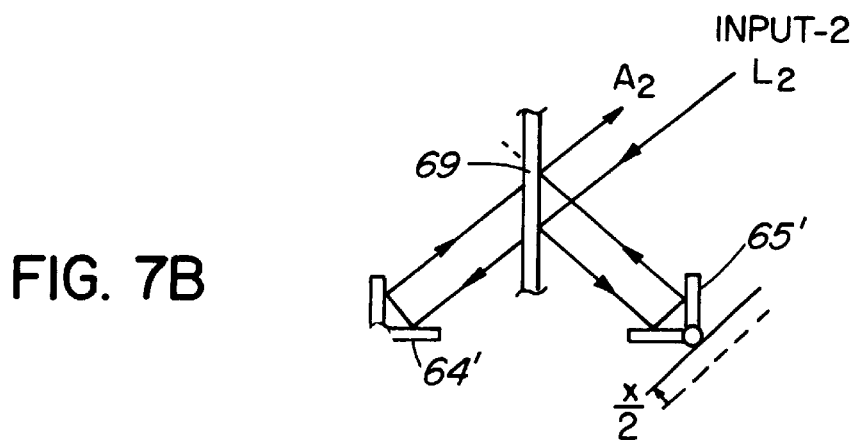
Figure 7C:
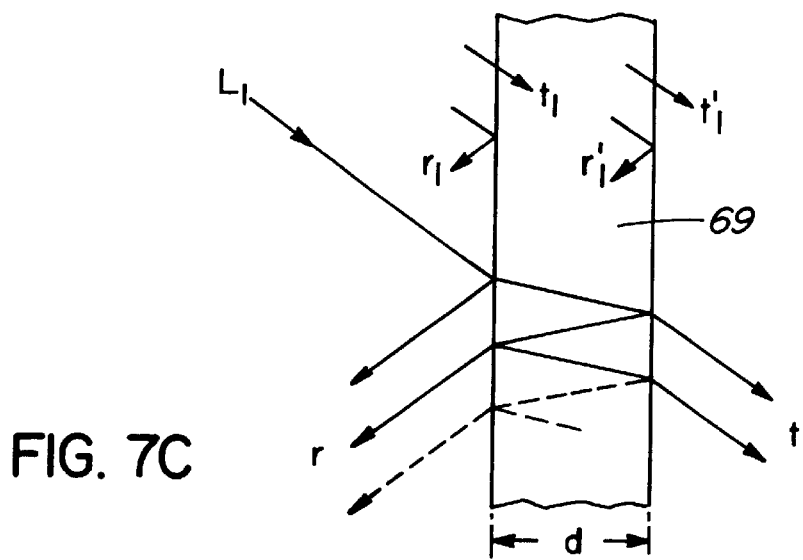

The ray tracings in FIGS. 7A and 7B indicate that the output amplitudes $A_1$ and $A_2$ for beams of unit amplitude incident on input-1 ($L_1$) and input-2 ($L_2$) respectively would be $$A_1 = rt + tre^{i\phi} \text{ and} \tag{16}$$

$$A_2 = rr + tte^{i\phi} \tag{17}$$

Where r and t represent the amplitude reflection and transmission of the layer and $\phi = 2\pi\sigma x$ expresses the phase difference between the two interfering beams $L_1$ and $L_2$ in terms of the optical path difference x. The amplitude reflection and transmission of the thin layer 69 can be explicitly evaluated by summing the contributions from multiple reflections and transmissions inside the layer 69. For a layer 69 symmetrically bounded by identical media as illustrated in FIG. 7C the summations yield:

$$r = \frac{r_1(1 - e^{-2i\delta})}{1 - r_1^2 e^{-2i\delta}} \text{ and} \tag{18}$$

$$t = \frac{(1 - r_1^2)e^{-i\delta}}{1 - r_1^2 e^{-2i\delta}} \tag{19}$$

with $\delta = 2\pi\sigma nd$ where $\delta$ is the phase shift due to a layer of optical thickness nd and n is the refractive index of the layer material. Equations (18) and 19 are obtained using the following identities between Fresnal coefficients associated to the interfaces of the layer 69:

$$r'_1 = -r_1 \text{ and} \tag{20}$$

$$t'_1 t_1 = (1 - r_1^2). \tag{21}$$

Equating the denominators of equations (18) and 19) leads to a simple expression connecting the amplitude reflection and transmission such that:

$$t = rHe^{-i\frac{\pi}{2}} \tag{22}$$

Where H is an intermediate variable defined as:

$$H = \frac{(1 - r_1^2)}{2r_1 \sin(\delta)} \tag{23}$$

Equations (22) and (23) are useful relations which simplify the analysis for obtaining the responsivities of an interferometer.

Referring back to equations (16) and (17) and multiplying the two output amplitudes by their complex conjugates ($A^*_1$ and $A^*_2$ respectively) yields the two output intensities $I_1$ and $I_2$ associated with each input port as follows:

$$I_1 = A_1 A^*_1 = (rt + tre^{i\phi})(r^* t^* + t^* r^* e^{-i\phi}) \tag{24}$$

and $$I_2 = A_2 A^*_2 = (r^2 + t^2 e^{i\phi})(r^{*2} + t^{*2} e^{-i\phi}) \tag{25}$$

Taking the coefficients of reflection in intensity of the layer $R = rr^*$ and inserting equation (22) into the two preceding equations yields for the output intensities:

$$I_1 = (2R^2 H^2 + 2R^2 H^2 \cos(\phi)) \text{ and} \tag{26}$$

$$I_2 = (R^2 + R^2 H^2 + 2R^2 H^2 \cos(\phi - \pi)). \tag{27}$$

The modulated components of intensities in equation (26) and (27) represent the interferograms associated to each input ports. It follows that the two responsivities $K_1$ and $K_2$ associated to each input are given by $$K_1 = 2R^2 H_2^2 \text{ and} \tag{28}$$

$$K_2 = -2R^2 H_2^2 \tag{29}$$

Figure 6B:
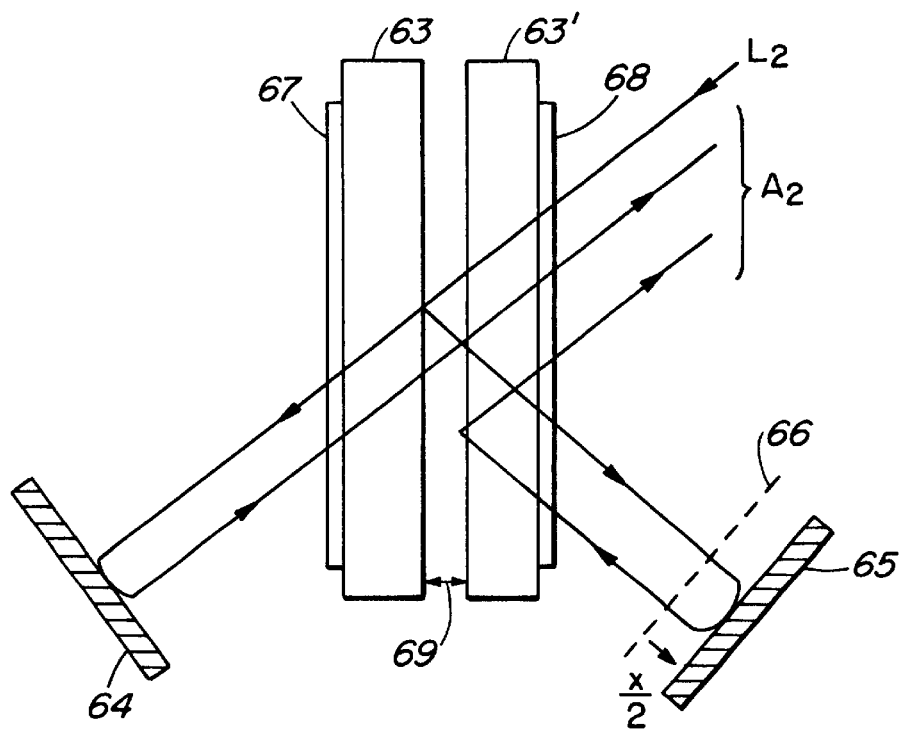

This satisfies a requirement for balanced responsivities where $K_1 = -K_2$ for a thin layer beam splitter in a double beam interferometer, but only for the thin layer itself. Although this configuration satisfies the condition for balanced responsivities, it can be shown that such a layer can generate unwanted self emissions when the layer is absorbing. Referring back to FIG. 6A and B which show a beam splitter having an optically thin layer of air 69 squeezed between two thick substrates 63 and 63' with antireflection coatings 67 and 68 on the substrate's external faces, the responsivities $K_1$ and $K_2$ associated with the transmissions of the substrates and coatings will next be considered. For this purpose, assume first that the two substrates and their antireflection coatings might be optically different to simulate a possible mismatch. The ray tracings in FIG. 6A and 6B would indicate that the output amplitudes $A_1$ and $A_2$ for beams of unit amplitudes incident on input $L_1$ and input $L_2$ (FIG. 6A and 6B respectively) are given by:

$$A_1 = (t_{c1}^3 t_{s1}^3 rtt_{c2}t_{s2}) + (t_{c1}t_{s1}trt_{c2}^3 t_{s2}^3 e^{i\phi}) \quad (30)$$

$$A_2 = (t_{c2}^2 t_{s2}^2 t^2 t_{c1}^2 t_{s1}^2) + (t_{c2}^2 t_{s2}^4 r^2 e^{i\phi}) \quad (31)$$

Where r and t represent the amplitude reflection and transmission of the thin air layer and $\phi$ is the phase difference between the two interfering beams. The variables $t_{c1}$, $t_{c2}$ and $t_{s1}$, $t_{s2}$ are the amplitude transmissions (see FIG. 6A) of the two antireflective coatings and the two substrates respectively. It is convenient, to simplify the analysis, to express these amplitude in term of their respective modules and phase as follows:

$$t_{s1} = t_{s1} e^{i\sigma_1} \text{ and } t_{s2} = t_{s2} e^{i\sigma_2} \quad (32)$$

$$t_{c1} = t_{c1} e^{i\Gamma_1} \text{ and } t_{c2} = t_{c2} e^{i\Gamma_2} \quad (33)$$

Using these expression equations (30) and (31) leads, after rearrangement, leads to $$A_1 = t_{c1}t_{s1}rtt_{s2}t_{c2}[t_{s1}^2 t_{c1}^2 e^{i(2\sigma_1 + 2\Gamma_1)} + t_{s2}^2 t_{c2}^2 e^{i(2\sigma_2 + 2\Gamma_2)} e^{i\phi}] \quad (34)$$

and $$A_2 = t_{c2}^2 t_{s2}^2 [t^2 t_{s1}^2 t_{c1}^2 e^{i(2\sigma_1 + 2\Gamma_1)} + r^2 t_{s2}^2 t_{c2}^2 e^{i(2\sigma_2 + 2\Gamma_2)} e^{i\phi}] \quad (35)$$

The two output intensities associated to each input port are found by multiplying the two output amplitudes by their conjugates ($A^*_1$ and $A^*_2$) which gives:

$$I_1 = A_1 A^*_1 = T_{c1}T_{s1}R^2T_{s2}T_{c2}[H^2T_{s1}^2T_{c1}^2 + H^2T_{s2}^2T_{c2}^2 + H^2T_{s1}T_{c1}T_{s2}T_{c2} \cos(\phi + \psi)] \quad (36)$$

and $$I_2 = A_2 A^*_2 = R^2T_{s2}^2T_{c2}^2[H^4T_{s1}^2T_{c1}^2 + T_{s2}^2T_{c2}^2 + H^2T_{s1}T_{c1}T_{s2}T_{c2} \cos(\phi + \psi - \pi)] \quad (37)$$

where a phase offset due to an imperfect compensation of the interferometer is defined as $$\psi = 2(\sigma_2 + \Gamma_2 - \sigma_1 - \Gamma_1) \quad (38)$$

The other quantities in capital letters are defined as follows:
R=rr*: Reflection in intensity of the thin layer of air,
$T_{s1} = t_{s1} t^*_{s1}$: Transmission in intensity of substrate 63 in FIG. 6A,
$T_{c1} = t_{c1} t^*_{c1}$: Transmission in intensity of the antireflective coating 67 onto substrate 63,
$T_{s2} = t_{s2} t^*_{s2}$: Transmission in intensity of substrate 63',
$T_{c2} = t_{c2} t^*_{c2}$: Transmission in intensity of the antireflective coating 68 onto substrate 63'.

Note that the transmission in intensity of the thin layer of air does not appear explicitly in equations (36) and (37) but is defined as $T=RH^2$ which is consistent with equation (22) connecting the reflection and transmission coefficients of a thin layer. Finally, in equations (36) and (37) the modulated components of the intensities represent the interferograms associated with each input port. It follows that the two complex responsivities $K_1$ and $K_2$ associated to each input are given by:

$$K_1 = K_1 e^{i\psi} = +R^2H^2T_{s1}^2T_{c1}^2T_{s2}^2T_{c2}^2 e^{i\psi} \quad (39)$$

and $$K_2 = K_2 e^{i\psi} = -R^2H^2T_{s1}T_{c1}T_{s2}^3T_{c2}^3 e^{i\psi} \quad (40)$$

which will satisfy the requirement for balance responsivities only when the two substrates 63,63' and their antireflection coating 67 and 68 are optically identical i.e. if $T_{s1}=T_{s2}$ and $T_{c1}=T_{c2}$. This will then result in: $K_1=-K_2=R^2H^2T_{s1}^4T_{c1}^4 e^{i\psi}$ so that the responsivities of the substrates and antireflective coating will be balanced when $T_{s1}=T_{s2}$ and $T_{c1}=T_{c2}$.

Figure 8A:
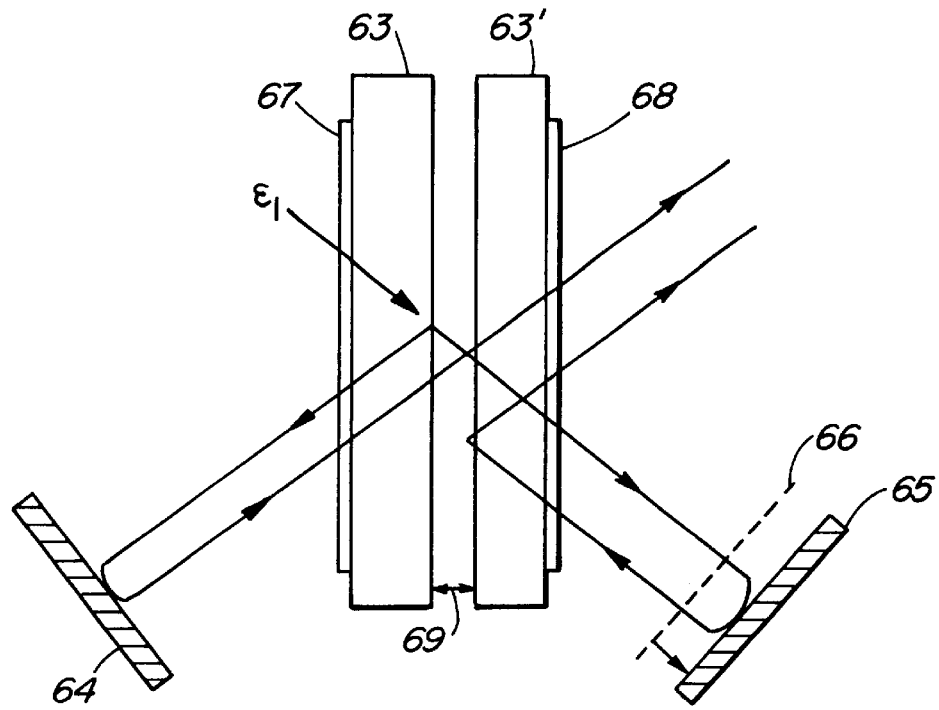
FIGS. 8A and 8B show ray tracing of internal self emission components from a first substrate ($\epsilon_1$ in FIG. 8A) and second substrate ($\epsilon_2$ in FIG. 8B) with an optically thin layer of air squeezed between the two substrates.
Figure 8B:
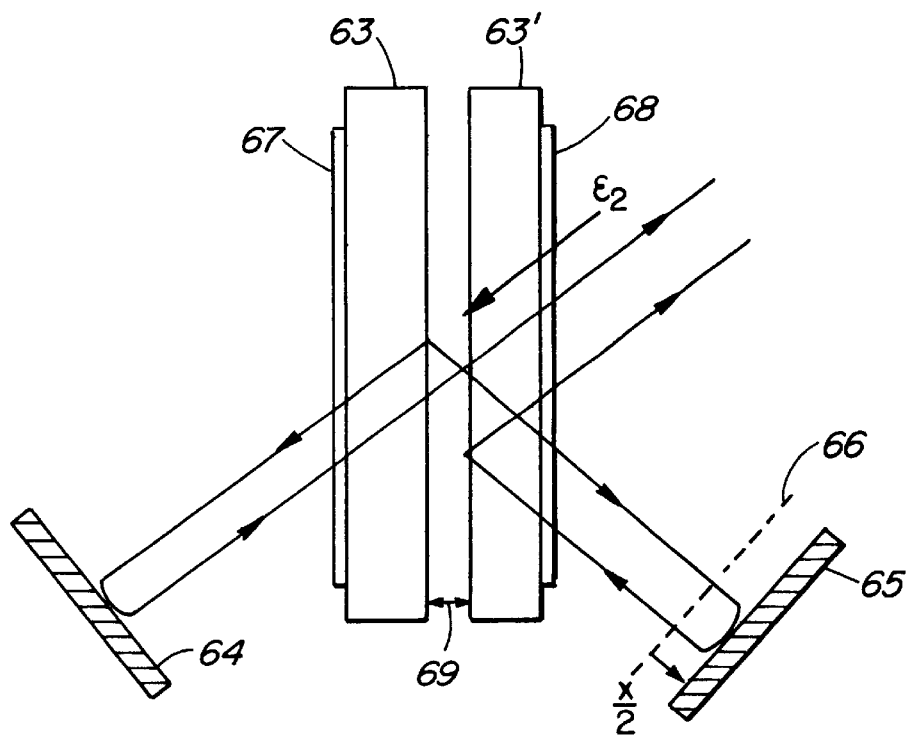

Another factor that needs to be considered is the two self emission components from each substrate in the beamsplitter. These self emission components are illustrated in FIGS. 8A and 8B, $\epsilon_1$ being the emission component associated with the first substrate 63 (FIG. 8A) and $\epsilon_2$ being the emission component of the second substrate 63' (FIG. 8B). It is first assumed in this analysis that both substrates 63 and 63' (along with their coatings) might be absorbing and that their temperatures are identical yielding a corresponding blackbody radiance equal to $B_s$. Using the parameters illustrated in FIGS. 6A and 8A and ones previously discussed, it is found that:

$$\epsilon_1 = (1 - T_{c1}T_{s1})B_s \quad (41)$$

where $\epsilon_1$ represents the emission component from the first substrate 63 which is incident on the air layer 69 (FIG. 8A). Note that the emission term in equation (41) vanishes if both the transmissions in intensity $T_{c1}$ (AR coating 67) and $T_{s1}$ (bulk substrate 63) are equal to one.

Using ray tracing and a mathematical development similar to that used previously, it can be shown that the modulated component of the interferogram associated to this first (63) substrate's emission is given by:

$$\text{MODULATION}(\epsilon_2) = [(1 - T_{c1}T_{s1})B_s]R^2H^2T_{s1}T_{c1}T_{s2}^2T_{c2}^2 \cos(\phi + \psi) \quad (42)$$

or, equivalently in the spectral domain, the corresponding raw spectrum associated with this first (63) substrate's emission is given by:

$$RAW\ SPEC(\epsilon_1) = K_1 \frac{(1 - T_{c1}T_{s1})}{T_{c1}T_{s1}} B_s \quad (43)$$

Where the complex responsivity $K_1$ defined in equation (39) has been introduced into the preceding equation (43).

The emission component $\epsilon_2$ (see FIG. 8B) from substrate 63' which is incident on the air layer 69 is similarly defined as $$\epsilon_2 = (1 - T_{c2}T_{s2})B_s \quad (44)$$

and the modulated component corresponding to the emission associated with substrate 63' is given by:

$$\text{MODULATION } (\epsilon_2) = [(1-T_{c2}T_{s2})B_s]R^2H^2T_{s1}T_{c1}T_{s2}^2T_{c2}^2 \cos(\phi+\psi-\pi) \quad (45)$$

or, equivalently, the corresponding raw spectrum emission is given by $$RAW\ SPEC(\epsilon_2) = K_2 \frac{(1-T_{c2}T_{s2})}{T_{c2}T_{s2}} B_s \quad (46)$$

Where the complex responsivity $K_2$ defined in equation (40) has been introduced into equation (46). Inspection of equations (42) and (45) shows that the two modulation terms are 180 degrees out of phase and these will cancel out when the two substrates 63 and 63' and their corresponding antireflective coatings (67 and 68) are optically identical, i.e. if $T_{c1}=T_{c2}$ and $T_{s1}=T_{s2}$. Therefore, when $T_{c1}=T_{c2}$ and $T_{s1}=T_{s2}$, then MODULATION $(\epsilon_1)$=−MODULATION $(\epsilon_2)$ which means that the real substrate emissions will not be detected at the interferogram level when the two substrates and their coatings are optically identical.

The previous discussions indicate that a beamsplitter having an optically thin layer of air squeezed between two thick substrates in a double beam interferometer would provide balanced responsivities when the two substrates and their antireflection coatings are optically identical which would cancel out at the beam splitter i.e. $K_1=-K_2$. In addition the thin layer would also satisfy the requirement for balanced responsivities where $K_1=-K_2$ as long as the layer is not absorbing. If that layer was absorbing, then the layer would generate unwanted self emissions but a thin layer of air is totally transparent and no self emissions would result from the layer itself. Furthermore, the self emissions terms from the substrates and their antireflective coatings would also cancel out when the two substrates and their coating are optically identical.

Figure 9:
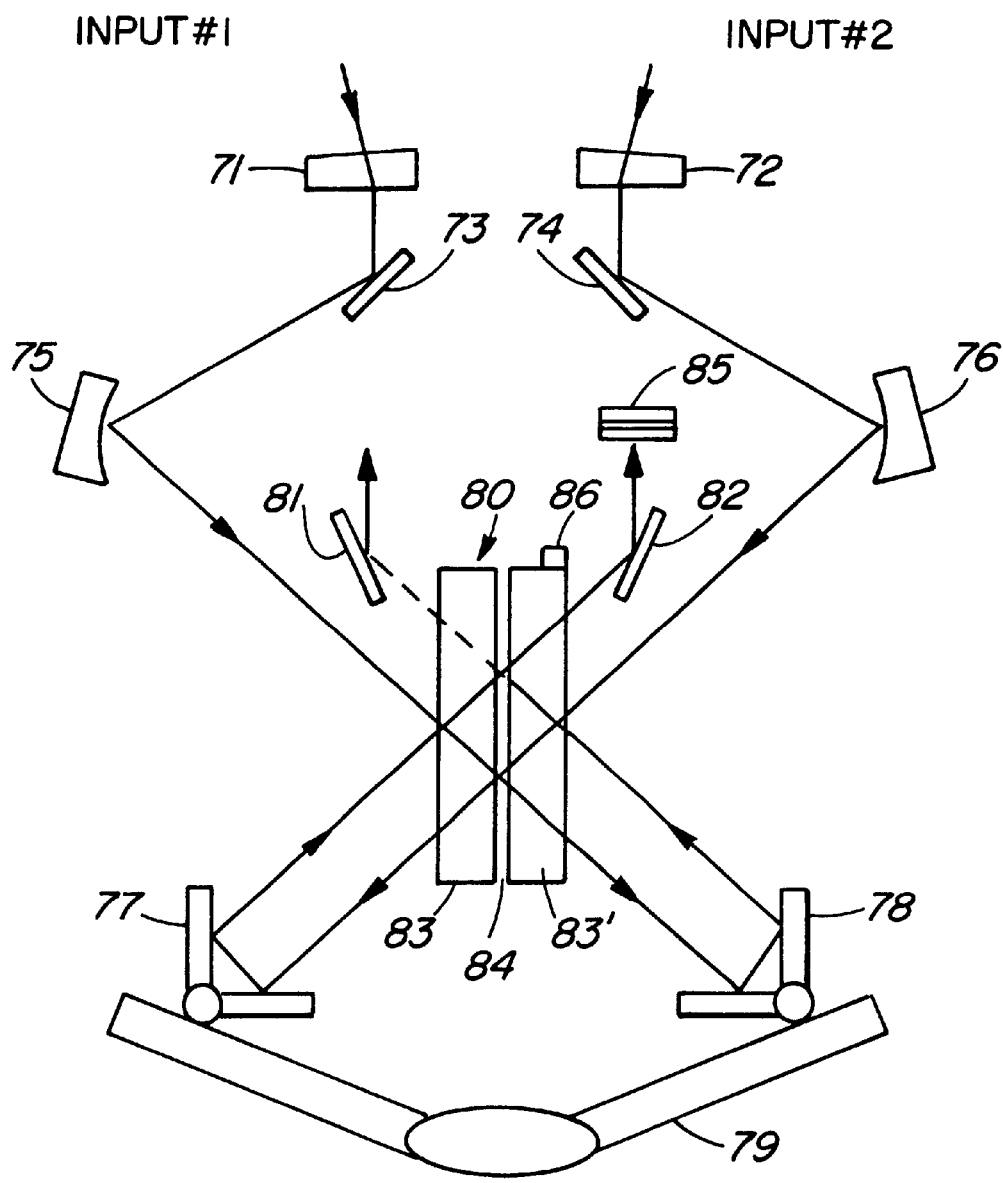
FIG. 9 is a schematic diagram of a Compact Atmospheric Sounding Interferometer (CATSI) with a beamsplitter according to one embodiment of the present invention.

To establish that the above analysis would apply to a physical instrument, a prototype double beam interferometer with the previously described beamsplitter configuration was built and this instrument is schematically illustrated in FIG. 9.

This Compact Atmospheric Sounding Interferometer (CATSI) prototype illustrated in FIG. 9 is designed for the passive remote sensing of target vapors. The CATSI instrument has two input ports (INPUT #1 and INPUT #2) which are directed towards two adjacent fields-of-view (FOVs). The first input port (INPUT #1) directs radiation originating from a first scene towards one side of beamsplitter 80 via an arrangement of windows and mirrors. The second input port (INPUT #2) directs radiation originating from the adjacent FOV second scene towards an opposite side of beamsplitter 80 via a similar arrangement of windows and mirrors. The two input ports with their mirrors and windows are made as symmetric as possible in order to keep, at least as far as possible, the beam attenuations and the self emissions in both ports identical. All reasonable efforts were made to respect this symmetry criteria.

The input window 71 for INPUT #1 directs a beam originating from a first scene to a mirror 73 that reflects the beam towards an off-axis parabolic mirror 75 which produces a collimated beam of proper diameter that is directed to one side of beamsplitter 80, i.e. onto the outer surface of substrate 83. That collimated beam transverses the beamsplitter 80 and extends to a corner reflector 78 where it is reflected back to the other side of beam splitter 80, i.e. onto the outer surface of substrate 83'. A portion of the reflected beam again transverses the beamsplitter and is directed to a mirror 81 where it is reflected outward. The input window 72 for INPUT #2 directs a beam originating from an adjacent second scene to a mirror 74 that reflects the beam away from the center axis of the instrument to an off-axis parabolic mirror 76 which produces a collimated beam of proper diameter that is directed to one side of beamsplitter 80 i.e. onto substrate 83' which is the side opposite to that on which a beam from the first scene was directed by parabolic mirror 75. This beam from the second scene transverses through the beamsplitter and travels to corner reflector 77 where it is reflected back to the beamsplitter 80, i.e. onto the substrate 83. A portion of that beam again transverses the beamsplitter 80 and directed to a mirror 82 which directs that portion of the beam outward to a detector 85. The input windows 71 and 72 are identical, as far as possible, along with the mirrors 73 and 74. The parabolic reflectors 75 and 76 are also identical to each other as well as corner reflectors 77 and 78. The window 71, reflector 73 and parabolic reflector 75 are arranged on one side of the axis of instrument with the beamsplitter being arranged on that axis. The window 72, reflector 74 and parabolic reflector 76 are arranged on the opposite side of the axis and in a symmetrical arrangement to the optics associated with INPUT #1 port. The corner reflectors 77 and 78 are also identical and arranged on opposite sides of the axis. These corner reflectors are formed of three right angled mirrors of standard corner cube reflectors mounted onto a double pendulum scanning mechanism 79 which controls the periodic displacement of the two corner reflectors 77 and 78 to generate the interferogram from the interference between the two collimated beams at the beamsplitter 80.

The prototype beamsplitter 80 consists of a thin air gap 84 ($\lambda/4$ at 7 $\mu$m) squeezed between two ZnSe substrates (83 and 83') having antireflective coatings (not shown) on their external faces. Substantially identical transmission coatings with properties to maximize the optical responsivity and transmission of the beamsplitter may be applied to inner surfaces of the substrates. This CATSI instrument contains a temperature sensor installed onto the beamsplitter mount (not shown) for calibration purposes. That temperature sensor is schematically illustrated in FIG. 9 as a block 86 at one corner of the beamsplitter 80. The mount should be formed of a material having a high heat conductivity so that any variations in temperature are rapidly stabilized. Of the two output channels, the beams reflected outward by reflectors 81 and 82, only the one output channel associated with reflector 82 is used in this prototype instrument. The output module at reflector 82 contains parabolic and condensing mirrors (not shown) that focus the output beam onto a sandwich MCT-InSb detector 85 (1 mm) mounted on a microcooler. The MCT (mercury-cadium-tellurium) element is optimized for detection in the 6–18 $\mu$m spectral region while the InSb element is optimized for the 2–5 $\mu$m region. This prototype CATSI instrument is made of two identical 4 inch diameter Newtonian telescopes optically coupled to the dual beam interferometer with a flat mirror placed in front of each telescope being rotatable to a selected scene. The pointing capability of this mirror allows azimuth measurements from 0 to 180 degrees. Coarse adjustments in azimuth and elevation can be simply achieved by rotating the whole assembly when it is mounted on a tripod. The prototype instrument is approximately 13×13×12 inches in size and weights about 40 pounds. Two CCD cameras mounted on the top of the telescope modules can be used to aim and view the scenes under consideration. Two scenes from adjacent FOVs can be optically combined with this instrument at the detector level yielding the spectral residual of the scenes. This CATSI system allowed measurements of the spectra according to the following specifications: scene field of view from 4 to 11 mrad, spectral coverage from 3 to 18 µm and a spectral resolution of 1 cm$^{-1}$ or greater.

It can be established that the raw spectrum S delivered by a double beam interferometer of the CATSI type may be defined referring to INPUT 1 characteristics with:

$$S = K_1 (L_1 + O_1) \tag{47}$$

and $$O_1 = \left(SE_{in1} + \frac{K_2}{K_1}L_2 + \frac{K_2}{K_1}SE_{in2} + \frac{E_{BS}}{K_1}\right) \tag{48}$$

or alternatively with the characteristics of INPUT 2 with $$S = K_2 (L_2 + O_2) \tag{49}$$

$$\text{and } O_2 = \left(SE_{in2} + \frac{K_1}{K_2}L_1 + \frac{K_1}{K_2}SE_{in1} + \frac{E_{BS}}{K_2}\right) \tag{50}$$

Where $L_1$ and $L_2$ are the two target source radiances with $K_1$, $K_2$ and $SE_{in1}$, $SE_{in2}$ being defined as the responsivities and self emissions associated with INPUT #1 and INPUT #2 respectively.

This particular configuration of beamsplitter in this prototype instrument uses a thin layer of air as a splitting layer resulting in the self emission term of the layer $E_{lay}$ being 0, yielding $E_{BS}=0$ and consequently:

$$O_1 = \left(SE_{in1} + \frac{K_2}{K_1}L_2 + \frac{K_2}{K_1}SE_{in2}\right) \text{ and } \tag{51}$$

$$O_2 = \left(SE_{in2} + \frac{K_1}{K_2}L_2 + \frac{K_1}{K_2}SE_{in1}\right). \tag{52}$$

Figure 10A:
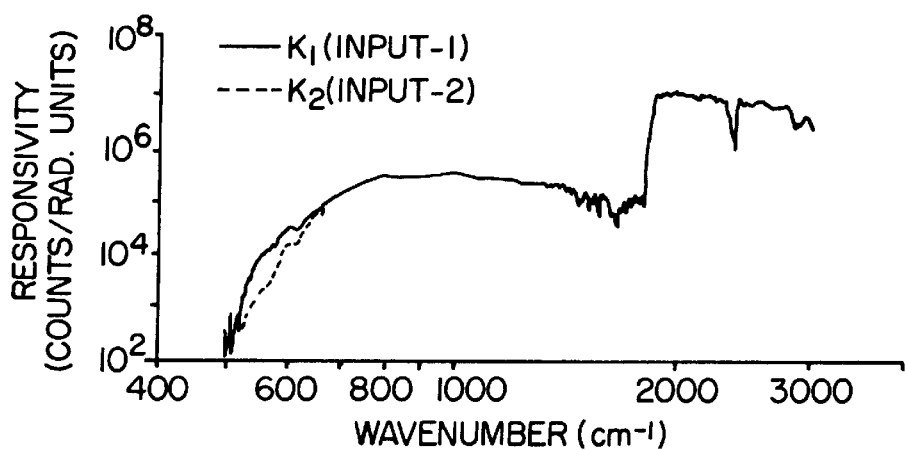
FIG. 10A shows the measured responsivities of the two inputs of the CATSI system of FIG. 9 in graphical form, which illustrates their similarity.
Figure 10B:
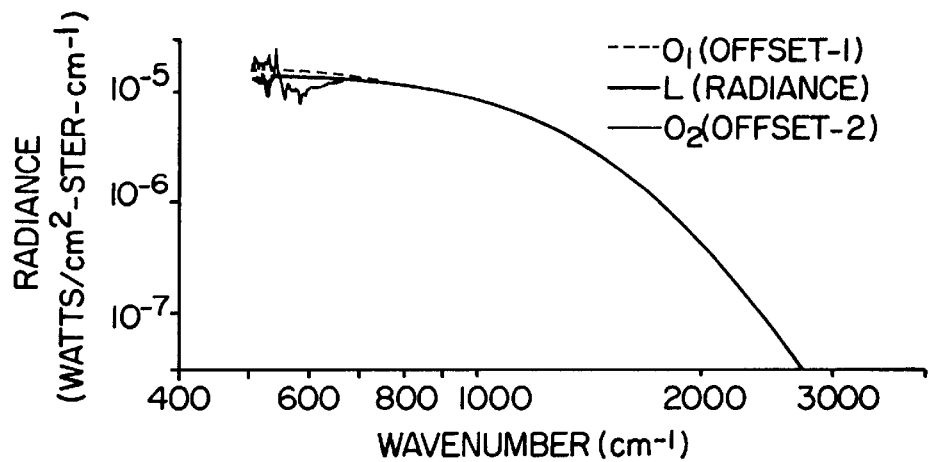
FIG. 10B shows the measured offsets associated with each of the two optical channels of the CATSI system of FIG. 9 in graphical form which illustrates their similarity.

It should be noted that the two substrate self emissions contributions are included in the input port emissions $SE_{in1}$ and $SE_{in2}$ in these last two equations. Experimental measurement of $K_1$, $K_2$ and $O_1$, $O_2$ would provide a quantitative approach to evaluate the compensation characteristic of this particular interferometer and for those measurements a two temperature calibration method was applied to the instrument. FIG. 10A represents the modules of the measured responsivities for INPUT 1 ($K_1$) and INPUT 2 ($K_2$). There is close agreement between the two spectra from 700 to 3000 cm$^{-1}$ which confirms that the high level of symmetry obtained with this FTIR configuration. FIG. 10B compares the modules of two measured offsets obtained when the calibration is done on INPUT 1 ($O_1$) or alternatively when it is done on INPUT 2 ($O_2$) for the case where both inputs look exactly the same source of radiance L=$L_1$=$L_2$, in this case a blackbody at 15° C. There is also close agreement between the two offsets $O_1$ and $O_2$ in the spectral region from 700 to 3000 cm$^{-1}$.

Another way to look at the optical subtraction capability of this instrument is provided by a suitable recast of equation (49) (taking INPUT 2) in a more convenient format to:

$$S = K_2(\delta L + re_2) \tag{53}$$

where ($\delta L = L_2 - L_1$ and $re_2$ accounts for a possible optical asymmetry and is defined as the instrument's residual which is given by:

$$re_2 = \left(1 + \frac{K_1}{K_2}\right)L_1 + \left(SE_{in2} + \frac{K_1}{K_2}SE_{in1}\right). \tag{54}$$

Figure 10C:
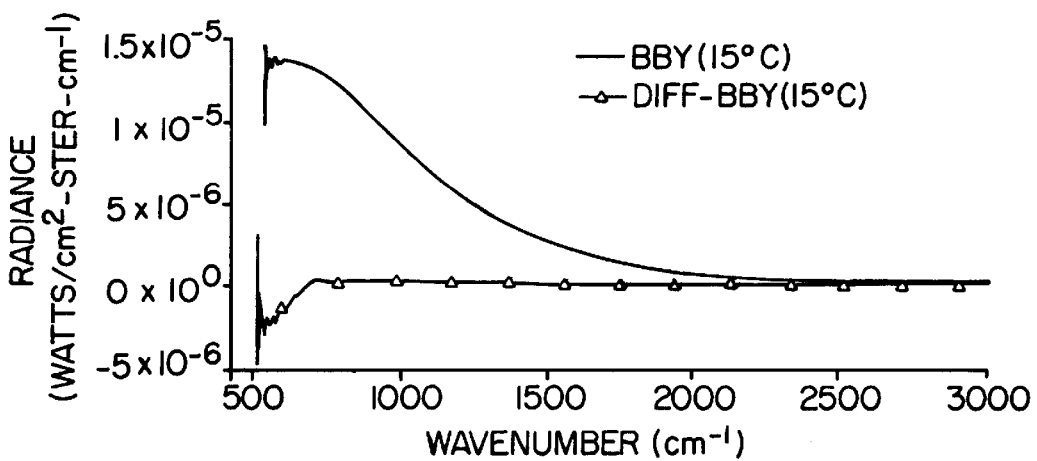
FIG. 10C is a graph of the measured instrument residual (unbalance) for the CATSI system of FIG. 9.

FIG. 10C shows an example of the measured instrument's residual $re_2$ at the bottom graph. An ideal instrument should have a residual at zero throughout the spectrum. It was found that this CATS1 prototype instrument's residual (unbalance) is not exactly zero but was usually smaller than 2% in the region from 700 to 3000 cm$^{-1}$ (3.5–15 µm). An unexpected strong residual was, however, found in the region from 500 to 700 cm$^{-1}$ as shown in FIG. 10c. It was concluded after extensive investigating that these imperfections, i.e. the strong residual, were a result of limited performance of the manufactured beamsplitter (prototype) whose substrates were manufactured to a 25 µm thickness tolerance. This investigating found an undesired disymmetry between the optical properties of the two ZnSe substrates which was partly due to non-identical antireflective coatings on the external faces of each substrate and partly due to a difference between the transmission associate with each substrate. Both effects introduce a disymmetry in the self emissions and attenuations associated with each input.

A useful model which predicts the instrument residual $re_2$ is given by:

$$re_2 = \left(1 + \frac{K_1}{K_2}\right)[L_1 - B_s]. \tag{55}$$

This relation entirely defines the instrument residual in terms of the beamsplitter's temperature ($B_s$), the source radiance ($L_1$) and the responsivity ratio. The preceding relations in equation (55) indicates that imperfections, due to manufacturing imperfections, can be predicted and compensated for in real time provided that the beamsplitter's temperature $B_s$ is known and that the responsivities ratio is well characterized. This CATS1 system (prototype) contains a temperature sensor installed onto the beamsplitter mount, which sensor is identified as 86 in the schematic drawing of FIG. 9. The responsivity ratio $K_1/K_2$ can be accurately evaluated by application of a two-temperature calibration method. Moreover, if the temperature dependence of the beamsplitter's spectral responsivity is predefined (from proper measurements), then the full calibration of the CATSI spectra can be realized in real time without any additional measurements. This reduces by a factor of 3 the number of operations normally necessary to generate a calibrated spectrum for a FTIR spectrometer.

Equations (39) and (40) showed that the phase differences between the two responsivities $K_1$ and $K_2$ for a beamsplitter with a thin layer of air squeezed between two substrates should be 180° out of phase at any wavenumber. Experimental results of the CATSI system do not, however, agree with this since phase differences other than 180° appear in the spectral region of strong substrate disymmetries between 530 and 680 cm$^{-1}$. This involves beamsplitter phase jumps in transmission which differ in polarization when there is absorption in the substrates and their associated antireflective coating. These effects of polarization in the CATSI beamsplitter are observed in the 530 to 680 cm$^{-1}$ region and are to be believed to be due to the combined absorption of ZnSe substrates and thorium fluoride present in the antireflective coatings.

Since the instrument residual re$_2$ can be determined in terms of the single beam splitter temperature B$_s$ along with the source radiance and the responsivity ratio; this indicates that automatic calibration of the instrument by modelling of the responsivity in terms of beamsplitter temperature should be possible. This modelling, however, would be rather complex if the temperature dependence of each hardware element (optical and electrical) affecting the responsivity is taken into account. To avoid that complexity, an empirical approach was employed based on the standard two-temperature calibration method being used to measure a series of spectral responsivities for a selected range of beamsplitter temperatures. These spectra were then assembled in the form of a look-up table and tagged with their respective beamsplitter temperatures. The responsivity corresponding to a specific beamsplitter temperature can be found from this by a linear interpolation done with the closest results of the look-up table.

To develop an operational procedure for an automatic calibration, an additional calibration function was implemented into the CATSI system which allows for the generation of two calibrated spectra for the same target. One calibrated spectra is derived from the usual two-temperature calibration method considered as the reference (actual) spectra and the second one is obtained by the automatic calibration based on monitoring the beamsplitter temperature. The compilation of pairs of calibrated spectra over a long period of time serves to establish the robustness of the automatic calibration approach and to evaluate the long term reproducibility.

Figure 11:
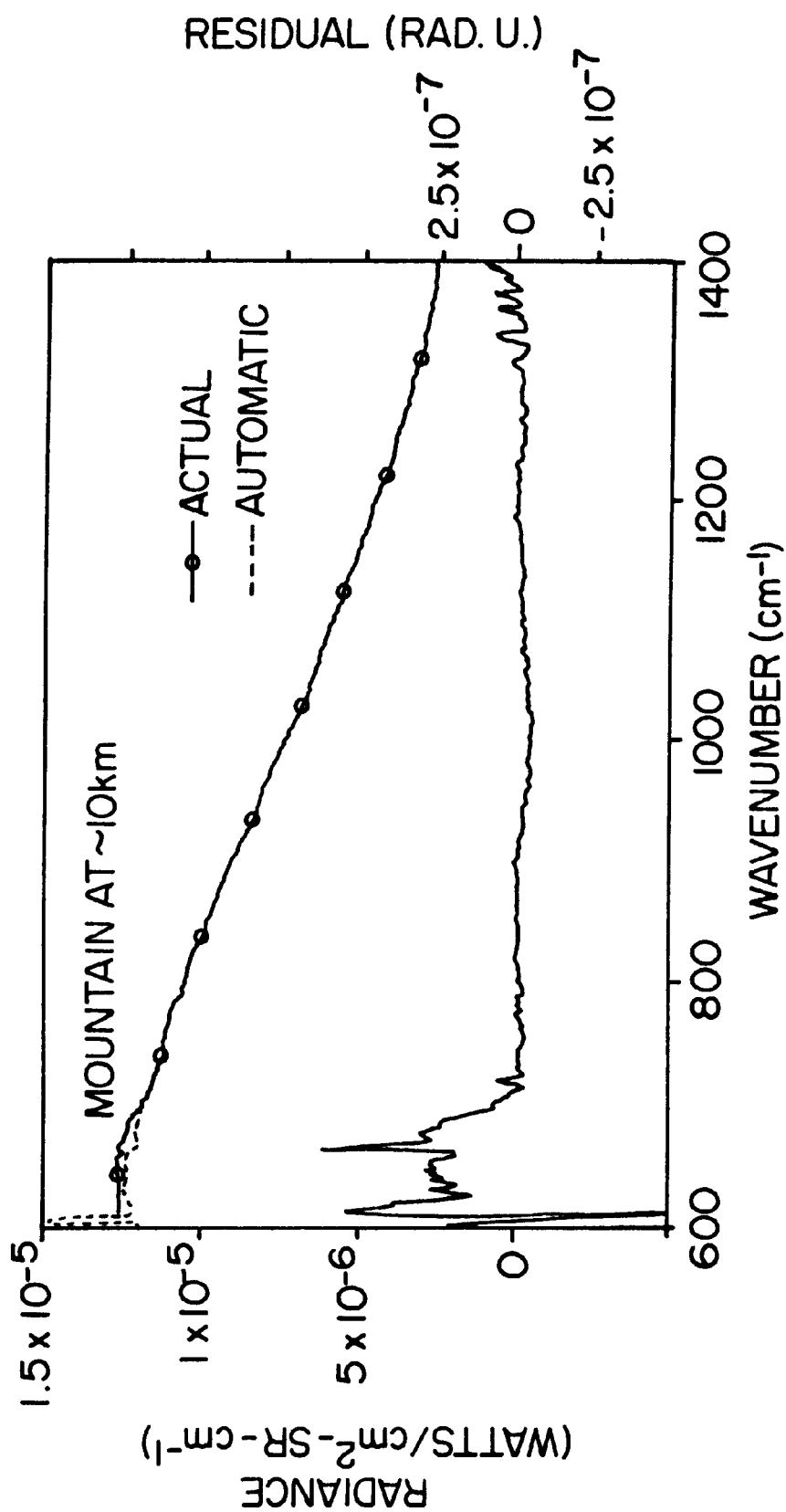
FIG. 11 contains graphs of the radiance spectrum of a mountain obtained by the CATSI system using a two temperature calibration (actual) and an automatic calibration of the instrument and includes a graph of the difference between the actual and automatic obtained graphs.

A comparison of the results of the two calibration methods (actual and automatic) is shown by the graphs in FIG. 11. The measurements in FIG. 11 were routine ones done to obtain the spectral radiance of a forested mountain (background) situated at 10 km and were recorded approximately two months after the characterization phase of the CATSI instrument, i.e. after the look-up table was developed. Even after a two month period, the stability is such that the automatic calibration based on the beamsplitter temperature (dashed line in FIG. 11) yields a spectral radiance quite similar to the actual one obtained by a two-temperature calibration method (—•— line in FIG. 11) with differences smaller than 5×10$^{-8}$ Watt/cm$^2$-sr-cm$^{-1}$ appearing in the spectral region from 700 to 1400 cm$^{-1}$ (7–14 um). The bottom curve in FIG. 11 represents the difference between the actual and the automatic curves. From an analysis of more than 500 field spectra, it has been found that the temporal drift of the responsivity and the offset of the CATSI instrument can be correlated to the instrument's temperature to within an error of 2% over a period of 8 days. There is a discrepancy (2–3%) in the region below 700 cm$^{-1}$ between the actual and automatic curves in FIG. 11 which indicates that the spectral coefficients for the automatic calibration procedure appear less stable in the region of beamsplitter dissymmetry. That dissymmetry in the region below 700 cm$^{-1}$ for the beamsplitter was noted previously along with discussion of the reasons believed to cause that dissymmetry.

In this description, terms such as "matched", "balanced", "similar" or "substantially identical" are used to designate that the elements are generally as near identical as practical noting that some differences will inevitably exist due to manufacturing limitations.

Various modification may be made to the preferred embodiment without departing from the spirit and scope of the invention as defined in the appended claims.

The embodiments of the invention in which an exclusive property or privilege is claimed are defined as follows:

1. A beamsplitter for an interferometer comprising two flat transparent substrates which are substantially identical in form and which have balanced transmission and emission characteristics at the wavelengths of interest, the substrates being superposed and mounted next to each other with an optically thin layer of air having a thickness smaller than one-half of the wavelengths of interest squeezed between adjacent flat surfaces of the substrates and said substrates having exterior flat surfaces opposite said adjacent flat surfaces with similar antireflective coatings on said exterior surfaces.

2. A beamsplitter as defined in claim 1 wherein the thin layer of air has a thickness of $\lambda/4$ at 7 $\mu$m.

3. A beamsplitter as defined in claim 1 wherein the two substrates are ZnSe substrates.

4. A beamsplitter as defined in claim 3 wherein the thin layer of air has a thickness of $\lambda/4$ at 7 $\mu$m.

5. A beamsplitter as defined in claim 1 wherein said adjacent flat surfaces of the substrates are coated with similar coatings having properties to maximize the optical transmission and responsivity of the beamsplitter assembly.

6. A beamsplitter as defined in claim 2 wherein said adjacent flat surfaces of the substrates are coated with similar transmission coatings having properties to maximize the optical transmission and responsivity of the beamsplitter assembly.

7. A beamsplitter as defined in claim 2 wherein the substrates are installed in a beamspliter mount with a temperature sensor being located on said mount.

8. A beamsplitter as defined in claim 7 wherein said mount is formed of a material having a high heat conductivity.

9. A double beam interferometer with simplified radiometric calibration capabilities having two matched optical input ports which can be directed to adjacent fields-of-view, the interferometer comprising a beamsplitter as defined in claim 1 positioned where optics associated with one input port directs a collimated beam of radiation from one field of view onto one exterior surface of the beamsplitter and optics associated with another of the input ports directs a collimated beam of radiation from an adjacent field-of-view onto an opposite exterior surface of said beamsplitter, the interferometer having substantially similar retroreflectors located to reflect radiation that transverses said beamsplitter from both beams back towards the exterior surfaces of the beamsplitter to produce an interferogram with the resulting output being directed outwards from the beamsplitter by optics towards a detector and wherein at least one of said retroreflectors is movable in a direction parallel to that of the beam of radiation associated with that retroreflector.

10. A double beam interferometer as defined in claim 9 wherein said beamsplitter is installed in a beamsplitter mount and a temperature sensor is located on said mount.

11. A double beam interferometer as defined in claim 9 wherein the retroreflectors are corner cube reflectors, and both retroreflectors are movable, each retroreflector being arranged on a separate arm of a double pendulum scanning mechanism.

12. A double beam interferometer as defined in claim 10 wherein the retroreflectors are corner cube reflectors and both retroreflectors are movable, each retroreflector being arranged on a separate arm of a double pendulum scanning mechanism.

13. A double beam interferometer with simplified radiometric calibration capabilities having two matched optical input ports which can be directed to adjacent fields-of-view, the interferometer comprising a beamsplitter as defined in claim 2 positioned where optics associated with one input port directs a collimated beam of radiation from one field of view onto one exterior surface of the beamsplitter and optics associated with another of the input ports directs a collimated beam of radiation from an adjacent field-of-view onto an opposite exterior surface of said beamsplitter, the interferometer having substantially similar retroreflectors located to reflect radiation that transverses said beamsplitter from both beams back towards the exterior surfaces of the beamsplitter to produce an interferogram with the resulting output being directed outwards from the beamsplitter by optics towards a detector and wherein at least one of said retroreflectors is movable in a direction parallel to that of the beam of radiation associated with that retroreflector.

14. A double beam interferometer as defined in claim 13 wherein said beamsplitter is installed in a beamsplitter mount and a temperature sensor is located on said mount.

15. A double beam interferometer as defined in claim 14, wherein the retroreflectors are corner cube reflectors and both reflectors are movable, each retroreflector being arranged on a separate arm of a double pendulum scanning mechanism.

16. A double beam interferometer with simplified radiometric calibration capabilities having two matched optical input ports which can be directed to adjacent fields-of-view, the interferometer comprising a beamsplitter as defined in claim 3 positioned where optics associated with one input port directs a collimated beam of radiation from one field of view onto one exterior surface of the beamsplitter and optics associated with another of the input ports directs a collimated beam of radiation from an adjacent field-of-view onto an opposite exterior surface of said beamsplitter, the interferometer having substantially similar retroreflectors located to reflect radiation that transverses said beamsplitter from both beams back towards the exterior surfaces of the beamsplitter to produce an interferogram with the resulting output being directed outwards from the beamsplitter by optics towards a detector and wherein at least one of said retroreflectors is movable in a direction parallel to that of the beam of radiation associated with that retroreflector.

17. A double beam interferometer as defined in claim 16, wherein said beamsplitter is installed in a beamsplitter mount and a temperature sensor is located on said mount.

18. A double beam interferometer with simplified radiometric calibration capabilities having two matched optical input ports which can be directed to adjacent fields-of-view, the interferometer comprising a beamsplitter as defined in claim 4 positioned positioned where optics associated with one input port directs a collimated beam of radiation from one field of view onto one exterior surface of the beamsplitter and optics associated with another of the input ports directs a collimated beam of radiation from an adjacent field-of-view onto an opposite exterior surface of said beamsplitter, the interferometer having substantially similar retroreflectors located to reflect radiation that transverses said beamsplitter from both beams back towards the exterior surfaces of the beamsplitter to produce an interferogram with the resulting output being directed outwards from the beamsplitter by optics towards a detector and wherein at least one of said retroreflectors is movable in a direction parallel to that of the beam of radiation associated with that retroreflector.

19. A double beam interferometer as defined in claim 18, wherein said beamsplitter is installed in a beamsplitter mount and a temperature sensor is located on said mount.

20. A double beam interferometer as defined in claim 19, wherein the retroreflectors are corner cube reflectors and both reflectors are movable, each retroreflector being arranged on a separate arm of a double pendulum scanning mechanism.

\* \* \* \* \*